United States Patent
Chonan et al.

(10) Patent No.: US 7,655,301 B2
(45) Date of Patent: Feb. 2, 2010

(54) LAMINATED STRUCTURE FOR SHIELDING AGAINST SOLAR RADIATION

(75) Inventors: Takeshi Chonan, Ichikawa (JP); Kenji Adachi, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 534 days.

(21) Appl. No.: 10/535,234

(22) PCT Filed: Oct. 18, 2004

(86) PCT No.: PCT/JP2004/015378

§ 371 (c)(1),
(2), (4) Date: Jun. 14, 2005

(87) PCT Pub. No.: WO2005/087680

PCT Pub. Date: Sep. 22, 2005

(65) Prior Publication Data

US 2006/0008640 A1 Jan. 12, 2006

(30) Foreign Application Priority Data

Mar. 16, 2004 (JP) ............................. 2004-073843

(51) Int. Cl.
*B32B 5/16* (2006.01)
*B32B 27/06* (2006.01)

(52) U.S. Cl. ...................... 428/328; 428/323; 428/412; 428/480

(58) Field of Classification Search ....................... None
See application file for complete search history.

(56) References Cited

U.S. PATENT DOCUMENTS

| | | | | |
|---|---|---|---|---|
| 2,952,575 A | * | 9/1960 | Baltzer | 359/359 |
| 3,457,106 A | * | 7/1969 | Gillery | 427/124 |
| 3,505,108 A | * | 4/1970 | Mochel | 428/433 |
| 5,830,568 A | * | 11/1998 | Kondo | 428/328 |
| 2002/0037071 A1 | * | 3/2002 | Kohda | 378/154 |
| 2002/0150744 A1 | | 10/2002 | Nagai | |
| 2005/0271566 A1 | * | 12/2005 | Yadav | 423/1 |
| 2006/0178524 A1 | | 8/2006 | Zuber et al. | |

FOREIGN PATENT DOCUMENTS

| | | |
|---|---|---|
| EP | 1 676 890 A1 | 7/2006 |
| JP | A 04-160041 | 6/1992 |
| JP | A 08-059301 | 3/1996 |
| JP | A 08-217500 | 8/1996 |

(Continued)

*Primary Examiner*—Monique R Jackson
(74) *Attorney, Agent, or Firm*—Oliff & Berridge, PLC

(57) ABSTRACT

To provide a laminated structure for shielding against solar radiation having high solar radiation blocking characteristics with low manufacturing costs. Fine particles 11 functioning to block solar radiation are obtained by firing tungstic acid under a reductive atmosphere, a liquid dispersion to form a solar radiation blocking material is prepared by crashing and dispersing treatment of the fine particles, a polymer base dispersing agent, and solvent, and thus prepared liquid dispersion to form a solar radiation blocking material is added to vinyl resin, which is molded into a sheet shape to obtain an intermediate film 12. Thus obtained intermediate film 12 is sandwiched between two sheets to be laminated selected from sheet-glass or plastic to obtain an intermediate layer 2, which is heated and bonded each other to prepare a laminated structure for shielding against solar radiation.

16 Claims, 5 Drawing Sheets

FOREIGN PATENT DOCUMENTS

| | | |
|---|---|---|
| JP | A 08-259279 | 10/1996 |
| JP | A 08-283044 | 10/1996 |
| JP | A 10-297945 | 11/1998 |
| JP | A 2000-233929 | 8/2000 |
| JP | A 2001-089202 | 4/2001 |
| JP | A 2002-265236 | 9/2002 |
| JP | A 2003-215328 | 7/2003 |
| JP | A 2005-226008 | 8/2005 |

* cited by examiner

FIG.1

| | LAMINATED STRUCTURE | VISIBLE LIGHT TRANSMITTANCE (%) | SOLAR RADIATION TRANSMITTANCE (%) | HAZE VALUE (%) |
|---|---|---|---|---|
| EXAMPLE 1 | LAMINATED STRUCTURE A | 70.8 | 47.6 | 0.4 |
| EXAMPLE 2 | LAMINATED STRUCTURE B | 72 | 49.4 | 0.3 |
| EXAMPLE 3 | LAMINATED STRUCTURE C | 75.8 | 47.8 | 0.4 |
| EXAMPLE 4 | LAMINATED STRUCTURE D | 71 | 42.6 | 0.4 |
| EXAMPLE 5 | LAMINATED STRUCTURE E | 70.9 | 41.4 | 0.4 |
| EXAMPLE 6 | LAMINATED STRUCTURE F | 71 | 39.9 | 0.4 |
| EXAMPLE 7 | LAMINATED STRUCTURE G | 73.5 | 48.1 | 0.3 |
| EXAMPLE 8 | LAMINATED STRUCTURE H | 71.2 | 48.1 | 0.5 |
| EXAMPLE 9 | LAMINATED STRUCTURE I | 72.3 | 48.2 | 0.4 |
| EXAMPLE 10 | LAMINATED STRUCTURE J | 71.8 | 46.8 | 0.4 |
| EXAMPLE 11 | LAMINATED STRUCTURE K | 73.5 | 48.2 | 0.4 |
| EXAMPLE 12 | LAMINATED STRUCTURE L | 72 | 41.1 | 0.3 |
| EXAMPLE 13 | LAMINATED STRUCTURE M | 71 | 46.3 | 0.4 |
| EXAMPLE 14 | LAMINATED STRUCTURE N | 71.1 | 48 | 0.4 |
| EXAMPLE 15 | LAMINATED STRUCTURE O | 72 | 46.9 | 0.4 |
| EXAMPLE 16 | LAMINATED STRUCTURE P | 70 | 35.7 | 0.4 |
| EXAMPLE 17 | LAMINATED STRUCTURE Q | 71 | 39.4 | 0.4 |
| EXAMPLE 18 | LAMINATED STRUCTURE R | 72 | 40.2 | 0.4 |
| EXAMPLE 19 | LAMINATED STRUCTURE S | 75 | 45 | 0.3 |
| EXAMPLE 20 | LAMINATED STRUCTURE T | 66.4 | 44 | 0.5 |
| EXAMPLE 21 | LAMINATED STRUCTURE U | 66.5 | 42.5 | 0.5 |
| EXAMPLE 22 | LAMINATED STRUCTURE V | 71.5 | 45.5 | 0.4 |
| COMPARATIVE EXAMPLE 1 | LAMINATED STRUCTURE W | 72 | 53.2 | 0.4 |

LAMINATED STRUCTURE FOR SHIELDING AGAINST SOLAR RADIATION

TECHNICAL FIELD

The present invention relates to a laminated structure for shielding against solar radiation used for a window material or the like for a vehicle such as a car, for a building, and for an airplane.

BACKGROUND ART

Conventionally, as a safety glass used for a car or the like, an article in which laminated glass is formed by sandwiching solar radiation blocking film between two pieces of sheet-glass, and solar energy incident from the laminated glass is blocked to reduce a load for cooling and feeling of heat has been proposed.

For instance, in Patent Document 1, laminated glass sandwiching a soft resin layer containing thermal radiation blocking metal oxide composed of tin oxide or indium oxide having a fine particle size of 0.1 μm or less between a pair of sheet-glass is disclosed.

In Patent Document 2, laminated glass formed by providing an intermediate layer in which metals such as Sn, Ti, Si, Zn, Zr, Fe, Al, Cr, Co, Ce, In, Ni, Ag, Cu, Pt, Mn, Ta, W, V, Mo; oxides, nitrides, or sulfides of these metals; doped materials of Sb or F, or composites of these materials are disposed between at least two pieces of sheet-glass is disclosed.

In Patent Document 3, window glass for a car in which fine particles of $TiO_2$, $ZrO_2$, $SnO_2$, and $In_2O_3$ and a glass component consisting of organic silicon or compounds of organic silicon are intervened between transparent sheet members is disclosed.

Still further, in Patent Document 4, a laminated glass is disclosed, in which an intermediate layer composed of three layers is provided between at least two pieces of transparent glass sheets, and in the second intermediate layer among the three layered intermediate layer, metal such as Sn, Ti, Si, Zn, Zr, Fe, Al, Cr, Co, In, Ni, Ag, Cu, Pt, Mn, Ta, W, V, and Mo; oxides, nitrides, sulfides, or doped materials of antimony (Sb) or fluorine (F), or composites of these materials are dispersed, or an intermediate layer between the first and third layers is made of resin.

However, either of the conventional laminated glasses disclosed in Patent Documents from 1 to 4 has a disadvantage of showing an insufficient solar radiation blocking function when high visible light transmittance is required.

On the other hand, the present applicants proposes, a laminated glass for shielding against solar radiation formed by sandwiching an intermediate layer functioning to block solar radiation between two pieces of sheet-glasses, in which the intermediate layer is composed of an intermediate film containing hexaboride fine particles alone with vinyl resin, or hexaboride fine particles and ITO fine particles and/or ATO fine particles with vinyl resin, or in which the intermediate layer is composed of a solar radiation blocking film containing the above-described fine particles, formed on a surface positioning on the inside of at least one sheet glass, and an intermediate film containing vinyl resin sandwiched between the above-described two pieces of sheet glass, as Patent Document 5. As described in the Patent Document 5, the optical characteristic of the laminated glass for shielding against solar radiation to which hexaboride fine particles alone or hexaboride fine particles and ITO fine particles and/or ATO fine particles are applied has the maximum transmittance in a visible light region and the minimum transmittance in a near-infrared region exhibiting strong absorption. Therefore, compared with the conventional laminated glass described in Patent Documents from 1 to 4, the laminated glass described in Patent Document 5 is improved in visible light transmittance by 70% or more, and in solar radiation transmittance of 50% range.

However, in order to make a practical laminated structure, still higher solar radiation blocking characteristics are required, and the haze value showing the cloudiness of a transparent material is required to be 1% or less for a window material of a vehicle and 3% or less for that of a building. Therefore, even in the laminated glass for shielding against solar radiation described in Patent Document 5, there still remains room for improvement.

[Patent Document 1] Japanese Patent Application Laid-open No. Hei 8-217500 (paragraph 0018)

[Patent Document 2] Japanese Patent Application Laid-open No. Hei 8-259279 (paragraph 0012)

[Patent Document 3] Japanese Patent Application Laid-open No. Hei 4-160041 (claim 1, Publication page 3, upper right column, lines 9-14, and page 3, lower left column, lines 16 to end)

[Patent Document 4] Japanese Patent Application Laid-open No. Hei 10-297945 (paragraph 0018)

[Patent Document 5] Japanese Patent Application Laid-open No. Hei 2001-89202 (paragraph 0012)

DISCLOSURE OF THE INVENTION

The present invention is achieved by focusing on these disadvantages, and an object of the present invention is to provide a laminated structure for shielding against solar radiation having high solar radiation blocking characteristics, with a low haze value at a reduced cost.

As a result of continuous earnest studies by the present inventors to solve the above problems, it is found that the object can be achieved by using tungsten oxide fine particles expressed by the general formula WyOz where W is tungsten, and O is oxygen, $2.0 < x/y < 3.0$, and/or composite oxide fine particles expressed by the general formula MxWyOz where W is tungsten, O is oxygen, $0.001 \leq x/y \leq 1$, and $2.0, z/y \leq 3.0$ as fine particles functioning to block solar radiation in a laminated structure for shielding against solar radiation.

That is, a first aspect relating to the present invention provides a laminated structure for shielding against solar radiation which sandwiches an intermediate layer containing fine particles functioning to block solar radiation between two pieces of sheets to be laminated selected from sheet glass, plastic, or plastic containing fine particles functioning to block solar radiation, wherein the fine particles functioning to block solar radiation comprise fine particles of tungsten oxide expressed by the general formula WyOz where W is tungsten, O is oxygen, and $2.0 < z/y \leq 3.0$, and/or composite tungsten oxide fine particles expressed by the general formula MxWyOz where M is one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, W is tungsten, O is oxygen, $0.001 \leq x/y \leq 1$, and $2.0 < z/y \leq 3.0$.

A second aspect of the present invention provides a laminated structure for shielding against solar radiation, sandwiching an intermediate layer not containing fine particles functioning to block solar radiation, between a plastic sheet to be laminated containing fine particles functioning to block solar radiation, and a sheet to be laminated selected from sheet glass, plastic, or plastic containing fine particles functioning to block solar radiation, wherein the fine particles functioning to block solar radiation comprise fine particles of tungsten oxide expressed by the general formula WyOz where W is tungsten, O is oxygen, and 2.0<z/y<3.0, and/or composite tungsten oxide fine particles expressed by the general formula MxWyOz where M is one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, W is tungsten, O is oxygen, $0.001 \leq x/y \leq 1$, and $2.0 < z/y \leq 3.0$.

A third aspect provides the laminated structure for shielding against solar radiation according to the first and the second aspect, wherein the diameter of fine particles functioning to block solar radiation is not less than 1 nm and not more than 800 nm.

A fourth aspect provides the laminated structure for shielding against solar radiation according to any one of the first to third aspects, wherein the powder color in a L*a*b* colorimetric system of fine particles of the tungsten oxide and/or fine particles of the composite tungsten oxide is between 25 to 80 for L*, −10 to 10 for a*, and −15 to 15 for b*.

A fifth aspect provides the laminated structure for shielding against solar radiation according to any one of the first to fourth aspects, wherein fine particles functioning to block solar radiation includes fine particles of composite tungsten oxide having a hexagonal or monoclinic crystal structure.

A sixth aspect provides the laminated structure for shielding against solar radiation according to any one of the first to fifth aspects, wherein the fine particles functioning to block solar radiation uses the mixture comprising:

fine particles of the tungsten oxide and/or fine particles of the composite tungsten oxide and fine particles of at least one kind among fine particles of oxides, fine particles of composite oxides, and fine particles of borides, formed by two or more elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Th, Dy, Ho, Y, Sm, Eu, Er, Tm, Th, Lu, Sr, Ca.

A seventh aspect provides the laminated structure for shielding against solar radiation according to the sixth aspect, wherein the mixing ratio of a mixture of fine particles of tungsten oxide and/or fine particles of the composite tungsten oxide with fine particles of at least one kind among fine particles of oxides, fine particles of composite oxides, and fine particles of borides, formed by two or more elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Th, Dy, Ho, Y, Sm, Eu, Er, Tm, Th, Lu, Sr, Ca, are from 95:5 to 5:95.

An eighth aspect provides the laminated structure for shielding against solar radiation according to any one from the first to seventh aspects, wherein the plastic is a sheet or film made of polycarbonate resin, acrylic resin, or polyethylene terephthalate resin.

A ninth aspect provides the laminated structure for shielding against solar radiation according to any one of the first or from the third to the seventh aspects, wherein the intermediate layer has an intermediate film, in which the fine particles functioning to block solar radiation are dispersed.

A tenth aspect provides the laminated structure for shielding against solar radiation according to any one of the first or from the third to seventh aspects, wherein the intermediate layer has an intermediate film stacked by two or more layers, and at least in one layer of which the fine particles functioning to block solar radiation are dispersed.

An eleventh aspect provides the laminated structure for shielding against solar radiation according to any one of the first or from the third to seventh aspects, wherein the intermediate layer includes a solar radiation blocking layer containing fine particles functioning to block solar radiation formed on the inner surface of at least either one of two sheets to be laminated selected from the sheet-glass and plastic, and an intermediate film overlapping with this solar radiation blocking layer.

A twelfth aspect provides the laminated structure for shielding against solar radiation according to any one of the first or from the third to seventh aspects, wherein the intermediate layer is structured in such that a ductile solar radiation blocking film substrate prepared by forming a solar radiation blocking layer containing fine particles functioning to block solar radiation on one surface of or inside a ductile resin film substrate is stacked between two or more layered intermediate film.

A thirteenth aspect provides the laminated structure for shielding against solar radiation according to any one of the first or from the third to seventh aspects, wherein the intermediate layer includes:

an intermediate film or two or more layered intermediate film, and a layered body in which an adhesive layer, the solar radiation blocking layer containing fine particles functioning to block solar radiation, and a peeling layer are stacked in this order, wherein the adhesive layer in the layered body adheres to the inner surface of one sheet to be laminated selected from sheet-glass or plastic, and wherein the peeling layer of the layered body is adhered to the intermediate film or two or more layered intermediate film.

A fourteenth aspect provides the laminated structure for shielding against solar radiation according to any one from the second to seventh aspects, wherein the intermediate layer includes an intermediate film not containing fine particles functioning to block solar radiation or two or more layered intermediate film not containing fine particles functioning to block solar radiation.

A fifteenth aspect provides the laminated structure for shielding against solar radiation according to any one from the ninth to fourteenth aspects, wherein resin to form the intermediate film is vinyl base resin.

A sixteenth aspect provides the laminated structure for shielding against solar radiation according to the fifteenth aspect, wherein vinyl base resin to form the intermediate film is polyvinyl butyral or ethylene-acetic acid vinyl copolymer.

According to the laminated structure for shielding against solar radiation relating to the first aspect, as fine particles functioning to block solar radiation, fine particles of tungsten oxide expressed by the general formula WyOz where W is tungsten, O is oxygen, 2.0<z/y<3.0, and/or fine particles of composite tungsten oxide expressed by the general formula MxWyOz where M is one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Ti, Si, Ge, Sn, Pb, Sb, B, F, P, S, Se, Br, Te, Ti, Nb, V, Mo, Ta, Re, W is tungsten, O is oxygen $0.001 \leq x/y \leq 1$, and $2.0 < z/y \leq 3.0$ is contained in the intermediate layer or the like sandwiched between two pieces of laminated sheets selected from sheet-glass and plastic, therefore, it is possible to obtain a laminated structure for shielding against solar radiation having high solar radiation blocking characteristics, a low haze value, and inexpensive production costs.

According to the laminated structure for shielding against solar radiation relating to the second aspect, a plastic sheet containing fine particles of tungsten oxide expressed by the above-described general formula WyOz and/or fine particles of composite tungsten oxide expressed by the general formula MxWyOz as fine particles functioning to block solar radiation on at least one of two laminated sheets to form this structure, and fine particles functioning to block solar radiation is not contained in an intermediate layer sandwiched by two sheets of laminated sheets. Therefore, it is possible to obtain a multifunctional laminated structure for shielding against solar radiation which has high solar radiation shielding characteristics, low haze value and production costs, and modifiable by the free and easy addition of suitable additives having effects such as UV cutting, color tone adjustment, or the like, to the intermediate film in compliance with the request.

When the diameter of the fine particles functioning to block solar radiation relating to the third means is in the range from 1 nm to 800 nm, industrial production of the fine particles functioning to block solar radiation is easy, and as a result of reducing light scattering in the visible light region, it becomes possible to obtain a highly transparent laminated structure for shielding against solar radiation.

As for the powder color expressed in the L*a*b* calorimetric system of the fine particles of tungsten oxide and/or composite tungsten oxide relating to the fourth means, since when L* is between 25 to 80, a* is −10 to 10, and b* is −15 to 15, the fine particles exhibit favorable optical characteristics as fine particles for shielding against solar radiation, it is possible to obtain a laminated structure for shielding against solar radiation with excellent solar radiation blocking characteristics by using the fine particles as the ones for shielding against solar radiation.

When the fine particles for shielding against solar radiation relating to the fifth aspects contain fine particles of composite tungsten oxide having a hexagonal or monoclinic crystal structure, since the fine particles having these crystal structures are chemically stable, and exhibit favorable optical characteristics as fine particles for shielding against solar radiation, it is possible to obtain a laminated structure for shielding against solar radiation with excellent stability and solar radiation blocking characteristics by using the fine particles as the ones for shielding against solar radiation.

As fine particles functioning to block solar radiation relating to the sixth aspect, by using a mixture of fine particles of the tungsten oxide and/or fine particles of the composite tungsten oxide; and fine particles of at least one kind among fine particles of oxides, fine particles of composite oxides, and fine particles of borides, formed by two or more elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Th, Dy, Ho, Y, Sm, Eu, Er, Tm, Th, Lu, Sr, Ca, the usage of fine particles of tungsten oxide and/or composite tungsten oxide can be reduced so that cost reduction effect can be exhibited.

As described in the seventh aspect, since the ratio of mixing fine particles of the tungsten oxide and/or fine particles of the composite tungsten oxide, and at least one kind of fine particles among oxides, fine particles of composite oxides, and fine particles of borides, formed by two or more elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Th, Dy, Ho, Y, Sm, Eu, Er, Tm, Th, Lu, Sr, Ca, are adjusted to the range from 95:5 to 5:95, it is possible to exhibit cost reduction effect while maintaining sufficient solar radiation blocking characteristics.

In the laminated structure for shielding against solar radiation described in the eighth aspect, plastic used as a laminated sheet for the laminated structure for shielding against solar radiation is a sheet or film made of polycarbonate resin, acrylic resin, or polyethylene terephthalate resin. Since these resins are transparent, it can be suitably applied to a transportation device or the like such as a car.

The laminated structure for shielding against solar radiation described in the ninth aspect wherein the intermediate layer has an intermediate film, in which fine particles functioning to block solar radiation are dispersed, has high solar radiation shielding characteristics, low haze value, and production costs with easy producibility.

Since the laminated structure for shielding against solar radiation described in the tenth aspect, has an intermediate film laminated with two or more layers as an intermediate layer, and the fine particles functioning to block solar radiation being dispersed at least in one layer of the intermediate film, has excellent solar radiation blocking characteristics, low haze value and production costs with easy producibility and furthermore, is possible to increase adhesion between the intermediate film not containing fine particles functioning to block solar radiation and the sheet to be laminated, the strength of the laminated structure for shielding against solar radiation is suitably high. Furthermore, it is modifiable by the free and easy addition of suitable additives having effects such as UV cutting, color tone adjustment, or the like, to the intermediate film in compliance with the request so as to obtain a multi-functional laminated structure for shielding against solar radiation.

The laminated structure for shielding against solar radiation described in the eleventh aspect, in which an intermediate layer has a solar radiation blocking layer containing fine particles functioning to block solar radiation, formed on an inner surface of at least one of two sheets to be laminated selected from the sheet-glass and plastic, and an intermediate film overlapping with the solar radiation shielding layer, can be set to have a thin solar radiation blocking film. Moreover, since the solar radiation blocking film exhibits an infrared reflection effect as well as absorption effect, it is possible to improve the solar radiation shielding characteristic of a laminated structure for shielding against solar radiation. Furthermore, the intermediate film is made to be an intermediate film not containing fine particles functioning to block solar radiation if desired, so that appropriate additives having an effect such as UV cutting, color tone adjustment, or the like can be freely and easily added to obtain a multi-functional laminated structure for shielding against solar radiation.

The laminated structure for shielding against solar radiation described in the twelfth aspect, wherein an intermediate layer is formed by laminating a ductile solar radiation blocking film substrate in which a solar radiation blocking layer containing fine particles functioning to block solar radiation is formed on one side or inside of a ductile resin film substrate with an intermediate film or between two layer or more of laminated intermediate films, can be set the film thickness of the solar radiation blocking film thin. Moreover, since the solar radiation blocking film exhibits infrared reflection effect as well as absorption effect, it is possible to improve solar radiation blocking characteristics of the laminated structure for shielding against solar radiation. Furthermore, the intermediate film can be made to be an intermediate film not containing fine particles functioning to block solar radiation if desired, so that appropriate additives having an effect such as UV cutting, color tone adjustment, or the like can be freely and easily added to obtain a multi-functional laminated structure for shielding against solar radiation.

The laminated structure for shielding against solar radiation described in the thirteenth aspect in which the intermediate layer includes an intermediate film or an intermediate film formed by laminating two or more layers, and a laminated body in which an adhesive layer, a solar radiation shielding layer containing fine particles functioning to block solar radiation, and a peeling layer are laminated in this order, the adhesive layer in the laminated body adheres to the inner surface of one of the laminated sheets selected from the sheet-glass and plastic, and the peeling layer of the laminated body adheres to the intermediate film or the intermediate film formed by laminating two or more layers, can be easily made the thickness of the solar radiation shielding layer thin.

In the laminated structure for shielding against solar radiation described in the fourteenth aspect having the intermediate film not containing fine particles which function to block solar radiation or two or more laminated intermediate films not containing fine particles which function to block solar radiation, a suitable adhesive property between the intermediate film and the sheet to be laminated can be obtained. Moreover, if desired, appropriate additives having an effect such as UV cutting, color tone adjustment, or the like can be freely and easily added to the intermediate film not containing fine particles having the solar radiation blocking function, and therefore a multifunction laminated structure for shielding against solar radiation can be obtained.

As described in the fifteenth aspect, when resin forming the intermediate film is vinyl base resin, a laminated structure for shielding against solar radiation favorable from the viewpoint of optical characteristics, mechanical properties, and material costs can be obtained. As described in the sixteenth aspect, when the vinyl base resin is polyvinyl butyral or ethylene-acetic acid copolymer, a laminated structure for shielding against solar radiation having further favorable optical characteristics and mechanical properties can be obtained.

BEST MODE FOR CARRYING OUT THE INVENTION

Regarding embodiments of the present invention, first, fine particles functioning to block solar radiation, then a laminated structure for shielding against solar radiation using the fine particles functioning to block solar radiation will be explained in detail below.

(Fine Particles Functioning to Block Solar Radiation)

Fine particles functioning to block solar radiation, applied to the present invention are fine particles of tungsten oxide expressed by the general formula $W_yO_z$ where W is tungsten, O is oxygen, satisfying $2.0<z/y<3.0$, and/or fine particles of composite tungsten oxide expressed by the general formula $M_xW_yO_z$ where M is one more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, W is tungsten, O is oxygen, satisfying $0.001 \leq x/y \leq 1$, and $2.0 < z/y \leq 3.0$. When the fine particles of tungsten oxide or composite tungsten oxide having the above-described general formulas are applied to a laminated structure for shielding against solar radiation, desired optical characteristics can be obtained.

As for compositional range of the tungsten and oxygen, when the fine particles of tungsten oxide which is the infrared blocking material is expressed by $W_yO_z$, the compositional ratio of oxygen to tungsten is preferably 2.0 or more and less than 3.0. If the value $z/y$ is greater than 2.0, it is possible to avoid a crystal phase of $WO_2$ which is an unintended substance appearing in the infrared blocking material, and at the same time, since chemical stability as a material can be obtained, it is applicable as an effective infrared blocking material.

On the other hand, when the value $z/y$ is less than 3.0, sufficient amount of required free electrons is produced so that an effective infrared blocking material can be obtained.

When the fine particles of tungsten oxide is expressed by the general formula $W_yO_z$, since a Magneli phase having a compositional ratio of $2.45 \leq z/y \leq 2.99$ is chemically stable and absorption characteristics in the near-infrared region are also favorable, it is more suitable as an infrared blocking material. For instance, $WO_{2.92}$, $WO_{2.90}$, $W_{20}O_{58}$, $W_{24}O_{68}$, $W_{17}O_{47}$, $W_{18}O_{49}$, and the like are given as examples.

Furthermore, by adding an element M to fine particles of the tungsten oxide, where M is one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re to be fine particles of composite tungsten oxide, free electrons are generated in the fine particles of the composite tungsten oxide, absorption characteristics resulting from the free electrons appear in the near-infrared region, which is desirable because it becomes effective as a near-infrared absorptive material in the vicinity of wavelength 1000 nm.

From fine particles of the composite tungsten oxide, more effective infrared blocking material can be obtained by controlling the above-described oxygen amount and, at the same time, by adding elements to create free electrons. When the general formula of the infrared blocking material obtained by performing both controlling of the oxygen amount and addition of elements to generate free electrons is expressed as $M_xW_yO_z$ where M is the above-described element M, W is tungsten, and O is oxygen, it is desirable to satisfy the relations $0.001 \leq x/y \leq 1$, and $2.0 < z/y \leq 3.0$, and to be fine particles of composite tungsten oxide having a hexagonal or monoclinic crystal structure.

First, the value $x/y$ showing the amount of an element M added will be explained. When the value $x/y$ is larger than 0.001, a sufficient amount of free electrons are generated so that the intended infrared blocking effect can be obtained. The greater the amount of element M, the more abundant the supply of free electrons so that the infrared blocking effect is also increased. When the value $x/y$ is about 1, the effect reaches its limit. It is desirable for the value $x/y$ to be less than 1, because formation of an impurity phase in the infrared blocking material can be avoided. A value from 0.01 to 0.5 is more desirable.

The element M is desirable one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re.

A value $z/y$ showing control of the oxygen amount will be explained next. As for the value $z/y$, in the composite tungsten oxide material expressed by $M_xW_yO_z$, since the same mechanism works as that of the tungsten oxide material expressed by the above-described $W_yO_z$, and in addition to that, also in $z/y \leq 3.0$, free electron supply is performed by the addition of the element M as described above, the condition is preferably $2.0 < z/y \leq 3.0$, more preferably $2.2 \leq z/y \leq 2.99$, and more preferably $2.45 \leq z/y \leq 2.99$. Furthermore, when fine particles of the composite tungsten oxide take a hexagonal or monoclinic crystal structure, since they become chemically stable and get favorable absorption characteristics in the near-infrared region, it is further preferable as an infrared blocking material.

Since the infrared blocking material relating to the present invention, containing fine particles of tungsten oxide and/or fine particles of composite tungsten oxide absorbs light in the near-infrared region, especially light having the wavelength in the vicinity of 1000 nm on a large scale, color tones of transmitted light are mostly bluish. The particle diameter of the infrared blocking material can be appropriately selected depending on the application. First, when it is used for application where its transparency is maintained, it is desirable to have a particle size equal to 800 nm or less. This is because particles smaller than 800 nm in diameter do not block light completely by scattering, keep the visibility in the visible region, and at the same time, effectively maintain the transparency. Especially when transparency in the visible light region is emphasized, it is desirable to consider scattering by particles further.

The particle diameter is preferably 200 nm or less, more preferably 100 nm or less, when reduction of scattering due to the particles is regarded as important. This is because when the diameter of the particle is small, scattering of light in the visible light region from 380 nm to 780 nm due to geometrical scattering or Mie scattering is reduced, and consequently, the infrared blocking film is prevented from becoming like frosted glass, so that transparency can be obtained. That is, when the particle size is 200 nm or less, the above-described geometrical scattering or Mie scattering is reduced to be in the Rayleigh region. In the Rayleigh scattering region, since the scattering of light is reduced in inverse proportion to the sixth power of the particle diameter, scattering decreases with decreasing particle diameter, and transparency is improved. Furthermore, when the particle diameter is 100 nm or less, scattering light is extremely small, which is desirable. From the point of view of avoiding light scattering, the particle diameter is desirably smaller, and if the particle diameter is 1 nm or more, it is easy to produce in an industrial scale.

By properly selecting the particle diameter in the above-described range, a haze value of the dispersion of a solar radiation blocking material in which fine particles of the solar radiation blocking material are dispersed in a medium can be 30% or less at 85% or less in visible light transmittance. When the haze value is 30% or less, the transparent substrate on which the fine particle dispersion of the solar radiation blocking material is applied by coating is prevented from becoming like frosted glass, and clear transparency can be obtained.

It is desirable from the point of view of improvement in weather resistance that the surface of fine particles exhibiting the solar radiation blocking function of the present invention be covered with oxides containing one or more kinds of Si, Ti, Zr and Al.

In order to obtain the required laminated structure for shielding against solar radiation, it is desirable to satisfy the condition that the powder color of the fine particles of the tungsten oxide and/or the fine particles of the composite tungsten oxide be between 25 to 80 for L*, −10 to 10 for a*, and −15 to 15 for b* in the L* a* b* colorimetric system (JIS Z 8729) recommended by Commision Internationale de l'Eclairage (CIE).

The reason that the fine particles for shielding against solar radiation relating to the present invention have the above-described powder color and exhibit a desirable optical characteristic will be explained briefly here. The interaction between typical light and electron in a substance will be explained first. It is known that a substance has its inherent plasma frequency and the light having longer wavelength than this frequency is reflected and the light having shorter wavelength is transmitted. A plasma frequency $\omega_p$ is expressed by the equation (2).

$$\omega_p^2 = nq2/\in m \quad (2)$$

where n is conduction electron density, q is charge of an electron, $\in$ is dielectric constant, m is effective mass.

As is clear from the equation (2), since when the conduction electron density of the substance increases, the plasma frequency becomes large, even light on the shorter wavelength side is reflected. Since the conduction electron density is in the $10^{22}/cm^3$ range for metal, the reflectance in metal starts to be high even in the visible light region. However, with tungsten oxide, visible light is allowed to pass through, but from the near-infrared light region, light begins to be absorbed in a high absorption ratio, so tungsten oxide can be used as a solar radiation blocking film. On the other hand, when fine particles of tungsten oxide are treated with a reducing gas, the powder color changes from pale yellow to yellowish green, from yellowish green to deep blue, and from deep blue to dark blue, and at the same time, the electrical resistance of its pressed powder decreases. The reason is considered to be that when fine particles of tungsten oxide are treated with a reducing gas, holes of oxygen are created in the fine particles, which increases the number of free electrons in the fine particles. That is, there is considered to be a close relation between the powder color of the fine particles of tungsten oxide, conduction electron density, and plasma frequency.

Material formed by mixing fine particles of the tungsten oxide and/or fine particles of the composite tungsten oxide; and fine particles of at least one kind among fine particles of oxides, fine particles of composite oxides, and fine particles of borides formed be two or more elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Th, Dy, Ho, Y, Sm, Eu, Er, Tm, Th, Lu, Sr, Ca, at a mixing ratio from 95:5 to 5:95 by weight are also desirable as fine particles functioning to block solar radiation.

When this mixing ratio is 95:5 or lower, the usage of fine particles of tungsten oxide and/or fine particles of composite tungsten oxide can be reduced, and cost reduction effect can be expected. On the other hand, when the mixing ratio is 5:95 or higher, sufficient solar radiation blocking characteristics can be expected.

(Method of Producing Fine Particles Functioning to Block Solar Radiation)

The methods of producing fine particles of tungsten oxide being fine particles functioning to block solar radiation, expressed by the general formula WyOz, and fine particles of tungsten oxide expressed by the general formula MxWyOz where M is the above-described element M, W is tungsten, O is oxygen, satisfying $0.001 \leq x/y \leq 1$, and $2.0 < z/y \leq 3.0$ will be explained.

(a). Method of Producing Fine Particles of Tungsten Oxide Expressed by the General Formula WyOz The above-described fine particles of tungsten oxide expressed by the general formula WyOz where w is tungsten, O is oxygen, satisfying $2.0 < z/y < 3.0$, are obtained by firing one or more of tungsten compounds selected from tungstic acid ($H_2WO_4$), ammonium tungstate, tungsten hexachloride, and tungsten hydrate obtained by adding water to tungsten hexachloride dissolved in alcohol in order to hydrolyze it and then evaporating the solvent, in an inert gas alone or in a mixed gas atmosphere of inert gas and reducing gas. There is no particular restriction on tungstic acid ($H_2WO_4$), ammonium tungstate, and tungsten hexachloride here.

However, when fine particles of tungsten oxide are produced by firing one or more of tungsten compounds selected from tungstic acid ($H_2WO_4$), ammonium tungstate, tungsten hexachloride, and tungsten hydrate obtained by adding water to tungsten hexachloride dissolved in alcohol in order to hydrolyze and then evaporating the solvent, it is desirable to set the firing temperature from 200° C. or more to 1000° C. or less from the point of view of required fine particle and its optical characteristic. When the firing temperature is in the range from 200° C. or more to 1000° C. or less, it is possible to produce fine particles of tungsten oxide having required optical characteristics. The firing time can be appropriately selected according to firing temperature, but could range between 10 minutes to 5 hours.

Next, in order to create oxygen holes in the fine particle of tungsten oxide prepared by firing one or more tungsten compounds selected from tungstic acid ($H_2WO_4$), ammonium tungstate, tungsten hexachloride, and tungsten hydrate obtained by adding water to tungsten hexachloride dissolved in alcohol in order to hydrolyze and then evaporating the solvent, fine particles of the tungsten oxide are baked in an inert gas alone or in a mixed gas atmosphere of an inert gas and a reducing gas. As the inert gas, such as a nitrogen gas, an argon gas, or a helium gas can be used, and as a reducing gas, a hydrogen gas, an alcoholic gas or the like can be used. When the fine particles of tungsten oxide are baked in a mixed gas atmosphere of inert gas and reducing gas, the concentration of the reducing gas in the inert gas is not particularly limited so far as it is appropriately selected according to the firing temperature. It could be 20 vol % or less, 10 vol % or less or 7 to 0.01 vol % in order of increasing desirability. When the concentration of reducing gas in the inert gas is 20 vol % or less, rapid reduction of fine particles of the tungsten oxide can be avoided, and generation of $WO_2$ having no solar radiation blocking function can be avoided.

Treatment temperature at the time of creating the oxygen holes in the fine particles of tungsten oxide can be appropriately selected according to atmosphere, and in the case of an inert gas alone, it is suitably over 650° C. to 1200° C. or less, desirably 1100° C. or less, more desirably 1000° C. or less from the point of view of crystallinity or shieldability as fine particles for shielding against solar radiation. On the other hand, in the case of a mixed gas of an inert gas and a reducing gas, it is recommended that the temperature be appropriately selected so as not to create $WO_2$ according to the concentration of the reducing gas. Furthermore, it is desirable from the viewpoint of solar radiation blocking characteristics that in the case of a two-step reaction of both atmospheres of an inert gas alone, and a mixed gas of an inert gas with a reducing gas, the temperature be selected for each step. For instance, firing should be from 100° C. to 650° C. inclusive in a mixed gas of an inert gas and a reducing gas, and the second step firing should be over 650° C. up to and including 1200° C. The duration of the firing process should be appropriately selected according to temperature, but 5 minutes to 5 hours should be sufficient.

Fine particles of produced tungsten oxide were between 25 to 80 for L*, −10 to 10 for a*, and −15 to 15 for b* as for the powder color in the L*a*B* colorimetric system. Furthermore, when X-ray diffraction analysis is performed for fine particles of the tungsten oxide, a diffraction peak in a $WO_{3-x}$ phase is observed, and existence of the so-called Magneli phase such as $W_{20}O_{58}$, $W_{18}O_{49}$, and the like was verified. As a result of chemical analysis, it is considered that it becomes a WyOz phase where W is tungsten, O is oxygen, satisfying 2.0<z/y<3.0.

(b). Method of Producing Fine Particles of Composite Tungsten Oxide expressed by the general formula MxWyOz where M is the above-described element M, W is tungsten, O is oxygen, satisfying $0.001 \leq x/y \leq 1$ and $2.0 < z/y \leq 3.0$ Fine particles of composite tungsten oxide expressed by the above-described MxWyOz where M is the above-described element M, W is tungsten, O is oxygen, satisfying $0.001 \leq x/y \leq 1$ and $2.0 < z/y \leq 3.0$ can be obtained by firing a dry mixed powder of one or more of tungsten compounds selected from tungstic acid ($H_2WO_4$), ammonium tungstate, tungsten hexachloride, and tungsten hydrate obtained by adding water to tungsten hexachloride dissolved in alcohol in order to hydrolyze and then evaporating the solvent, and oxide of element M and/or powder of the hydroxide, in one step in an inert gas atmosphere or in a mixed atmosphere of an inert gas and a reducing gas, or by firing in two steps, first in a mixed gas atmosphere of an inert gas and a reducing gas and then in an inert gas atmosphere. Furthermore, instead of the above-described tungsten compound, fine particles of tungsten oxide prepared according to paragraph (a) can be used.

The fine particles of the composite tungsten oxide can be obtained by firing a dry powder obtained by drying a mixed solution which is obtained by wet-mixing one or more tungsten compounds selected from tungstic acid ($H_2WO_4$), ammonium tungstate, tungsten hexachloride, and tungsten hydrate obtained by adding water to tungsten hexachloride dissolved in alcohol to hydrolyze and then evaporating the solvent, with a solution containing salt of the above-described element M, in two steps of first one step being in an inert gas atmosphere alone or in a mixed gas atmosphere of an inert gas and a reducing gas, or by firing in a mixed gas atmosphere of an inert gas and a reducing gas as a first step and further in an inert gas atmosphere as the second step. Furthermore, instead of the above-described tungsten compound, fine particles of tungsten oxide prepared according to paragraph (a) can be used.

As described above, element M to be added is desirably one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re. Either of these elements can be served to improve solar radiation blocking characteristics and weather resistance of fine particles of composite tungsten oxide. From the viewpoint of improving the solar radiation blocking characteristics, elements belong to alkali metal, alkaline-earth metal, and transition metal are desirable, and from the point of view of improving the weather resistance, elements belong to 3B family elements, 4B family elements, 5B family elements, and 4A family elements are desirable.

Oxides or hydroxides are preferable for a compound of element M, when adding element M to one or more compounds selected from tungstic acid ($H_2WO_4$), ammonium tungstate, tungsten hexachloride, tungsten hydrate obtained by adding water to tungsten hexachloride dissolved in alcohol to hydrolyze and then evaporating the solvent, and fine particles of tungsten oxide, using a dry mixing method. The oxide or hydroxide of the element M is mixed with one or more kinds selected from tungstic acid ($H_2WO_4$), ammonium tungstate, tungsten hexachloride, and tungsten hydrate obtained by adding water to tungsten hexachloride dissolved in alcohol to hydrolyze and then evaporating the solvent, fine particles of tungsten oxide. The dry mixing can be performed with a commercial stone mill, ball mill, or the like can be used.

As a mixing method different from the above-described dry mixing method, it is acceptable that after mixing an aqueous solution of salt of the above-described element M to one or more compounds selected from fine particles of tungstic acid ($H_2WO_4$), ammonium tungstate, tungsten hexachloride, and tungsten hydrate obtained by adding water to tungsten hexachloride dissolved in alcohol in order to hydrolyze and then evaporating the solvent, fine particles of tungsten oxide, the mixture solution is dried to obtain dry powder. In this case, the salt of the element M is not particularly limited. Nitrate, sulfate, chloride, and carbonate can be cited for instance. Drying temperature and drying period of time after the wet mixing are not particularly limited.

In order to create the oxygen holes in the fine particles of the composite tungsten oxide, firing is performed in one step in an inert gas atmosphere alone or in a mixed atmosphere of an inert gas and a reducing gas, or by firing in two steps, first in a mixed atmosphere of an inert gas and a reducing gas in the first step, and then again in an inert gas atmosphere in the second step. Concentration and firing temperature in the inert gas alone, in the mixed gas of an inert gas and a reducing gas, and the reducing gas in the inert gas used in this firing treatment are the same as those of the inert gas, of the reducing gas, and of the reducing gas in the inert gas explained in the above-described (a).

The fine particles of produced composite tungsten oxide are, as for the powder color in the $L^*$ $a^*$ $b^*$ colorimetric system, between 25 to 80 for $L^*$, $-10$ to 10 for $a^*$, and $-15$ to 15 for $b^*$. Furthermore, when X-ray diffraction analysis is performed for fine particles of the composite tungsten oxide, existence of hexagonal or monoclinic system was verified. As a result of chemical analysis, it is considered that it becomes a MxWyOz phase where the relation is satisfied as $0.001 \leq x/y \leq 1$, and $2.0 < z/y \leq 3.0$.

(Laminated Structure for Shielding Against Solar Radiation)

Next, a laminated structure for shielding against solar radiation in which an intermediate layer is sandwiched between two pieces of sheets to be laminated selected from sheet-glass, and plastic, and at least either one of the intermediate layer or plastic includes fine particles functioning to block solar radiation, will be explained.

The sheets to be laminated are sheets to sandwich the intermediate layer from both sides, and sheet-glass or plate shaped plastic transparent in the visible light region is used. At this time, two pieces of sheets to be laminated selected from sheet-glass or plastic plate include respective structures of sheet-glass and sheet-glass, sheet-glass and plastic, and plastic and plastic.

It should be noted that material of the plastic when plastic is used as a laminated structure for shielding against solar radiation is appropriately selected according to the use of the laminated structure for shielding against solar radiation, and it is not particularly limited and possible to select according to the use. For instance, when used for a transportation device such as a car or the like, from the viewpoint of securing see-through of a driver or occupants in the transportation device, transparent resin such as polycarbonate resin, acrylic resin or polyethylene terephthalate resin is desirable, but other resin such as PET resin, polyamide resin, vinyl chloride resin, olefin resin, epoxy resin, polyimide resin, fluoro resin, and the like can be used.

As embodiment examples of a laminated sheet, there are an embodiment of using sheet-glass or the above-described plastic as a plain sheet (in the specification, referred to as Embodiment A for the sake of convenience), and an embodiment of using the above-described plastic allowing to contain fine particles functioning to block solar radiation (in the present specification, referred to as Embodiment B). A method of containing fine particles functioning to block solar radiation in the plastic will be explained next.

When kneading fine particles for shielding against solar radiation into the plastic, the plastic is heated to a temperature near its melting point (about 200 to 300° C.) and mix the fine particles for shielding against solar radiation. Then, a mixture of plastic and fine particles for shielding against solar radiation is palletized so that it is possible to form into a shape of film or sheet by any desired method. For instance, extrusion molding, inflation molding, solution casting, and casting method can be used for molding. The thickness of film, board or the like at this time can be appropriately selected according to its purpose of application. The amount of addition of fine particles for shielding against solar radiation to the plastic can be changed according to the thickness of film, sheet material, or required optical characteristics or mechanical characteristics, but it is usually desirable for it to be 50 wt % or less of the resin.

As embodiments of an intermediate layer functioning to block solar radiation, there are an Embodiment formed by an intermediate film containing fine particles functioning to block solar radiation (referred to as Embodiment 1 in the present specification, for the sake of convenience), an Embodiment formed by two or more layers of intermediate films, allowing at least one layer out of the layers to contain fine particles functioning to block solar radiation (referred to as Embodiment 2 in the present specification, for the sake of convenience), an Embodiment to form a solar radiation blocking layer containing fine particles functioning to block solar radiation on the inner surface of at least one sheet-glass or one plastic, and an intermediate film is overlapped on the solar radiation blocking layer (referred to as Embodiment 3 in the present specification, for the sake of convenience), an Embodiment formed by a solar radiation blocking layer containing fine particles functioning to block solar radiation formed on one surface of a ductile resin film substrate or inside a ductile film substrate and an intermediate film laminated with two or more layers (referred to as Embodiment 4 in the present specification, for the sake of convenience), an Embodiment to form a solar radiation blocking layer containing fine particles functioning to block solar radiation on one surface of the intermediate layer (referred to as Embodiment 5 in the present specification, for the sake of convenience) and an Embodiment in which an intermediate layer includes bonds an adhesive layer in a layered body stacked with the adhesive layer, a solar radiation blocking layer containing fine particles functioning to block solar radiation, a peeling layer in this order on the inside surface of one out of two pieces of laminated sheets selected from the sheet-glass and plastic, and includes an intermediate film or laminated intermediate film stacked with two or more layers, overlapping with the above-described laminated body on the peeling layer side of the above-described laminated body (referred to as Embodiment 6 in the present specification, for the sake of convenience). Furthermore, there is an Embodiment in which the intermediate layer does not contain fine particles functioning to block solar radiation (referred to as Embodiment 7 in the specification, for the sake of convenience).

As materials forming an intermediate film, synthetic resin is desirable from a viewpoint of optical characteristics, mechanical properties, and material costs, and vinyl resin is more desirable. Furthermore, from the same viewpoint, polyvinyl butyral or ethylene-acetic acid vinyl copolymer is desirable among the vinyl base resin.

Taking a case of using vinyl base resin as an intermediate film as an example, about respective Embodiments from 1 to 7 which are combined with Embodiments A and B of the above-described laminated sheets will be explained below, referring to FIG. 2 to FIG. 8. Note that FIG. 2 to FIG. 8 are schematic sectional views of laminated structures for shielding against solar radiation.

Embodiment A-1

A laminated structure for shielding against solar radiation formed by using sheet-glass or plastic not containing fine particles functioning to block solar radiation as a sheet to be laminated, and an intermediate layer formed by fine particles functioning to block solar radiation and intermediate film can be produced as follows, for instance.

A vinyl base resin composition is prepared by adding an additive solution in which fine particles functioning to block solar radiation are dispersed into plasticizer, to vinyl base resin, and by forming the vinyl base resin composition into a sheet-shape to obtain an intermediate film sheet. By sandwiching the intermediate film sheet between two pieces of sheets to be laminated selected from sheet-glass and plastic, and bonding together to obtain a laminated structure for shielding against solar radiation.

It should be noted that though the above explanation is made for a case of dispersing fine particles functioning to block solar radiation into plasticizer, it is also possible to prepare a vinyl base resin composition by a method of adding a dispersion in which fine particles functioning to block solar radiation are dispersed in a suitable solvent being not plasticizer, to vinyl base resin, and plasticizer is added separately.

Through this procedure, it is possible to produce a laminated structure for shielding against solar radiation having high solar radiation blocking characteristics and a low haze value. Furthermore, this method facilitates production of a laminated structure for shielding against solar radiation, and can produce a laminated structure for shielding against solar radiation at inexpensive production costs.

FIG. 2 shows a sectional view of one example of the laminated structure for shielding against solar radiation relating to the Embodiment A-1. As shown in FIG. 2, the laminated structure for shielding against solar radiation sandwiches an intermediate layer 2 with two pieces of sheets to be laminated 1. The intermediate layer 2 is formed by an intermediate film 12 containing fine particles 11 functioning to block solar radiation in dispersion.

Embodiment B-1

A laminated structure for shielding against solar radiation formed by using plastic containing fine particles functioning to block solar radiation as at least one of the laminated sheets, and an intermediate layer is formed by fine particles functioning to block solar radiation and an intermediate film can be produced in the same manner as Embodiment A-1 except that at least one out of two pieces of sheet-glass or plastic not containing fine particles functioning to block solar radiation is replaced by plastic containing fine particles functioning to block solar radiation.

This Embodiment can produce a laminated structure for shielding against solar radiation having high solar radiation blocking characteristics and a low haze value similarly to the Embodiment A-1. Furthermore, this method can produce a laminated structure for shielding against solar radiation which facilitates production of the laminated structure for shielding against solar radiation and a laminated structure for shielding against solar radiation at inexpensive production costs.

Embodiment A-2

A laminated structure for shielding against solar radiation which uses sheet-glass or plastic not containing fine particles functioning to block solar radiation as a sheet to be laminated, and an intermediate layer having two or more layers of intermediate films, is formed by at least one layer of the intermediate films containing fine particles functioning to block solar radiation, is prepared as follows, for instance.

A vinyl base resin composition is prepared by adding an additive solution in which fine particles functioning to block solar radiation are dispersed into plasticizer to vinyl base resin, and by forming the vinyl base resin composition into a sheet-shape to obtain an intermediate film sheet. Then, the intermediate film sheet is laminated with other intermediate film sheet not containing fine particles functioning to block solar radiation, or the intermediate film sheet is allowed to intervene between two layers of intermediate film sheets not containing fine particles functioning to block solar radiation. This is sandwiched between two pieces of sheets to be laminated selected from sheet-glass and plastic, and bonded together. The method of producing a laminated structure for shielding against solar radiation includes the above method.

It should be noted that similarly to Embodiment 1, fine particles functioning to block solar radiation is not dispersed into plasticizer, it is also possible to prepare a vinyl base resin composition by a method of adding a dispersion in which fine particles functioning to block solar radiation are dispersed in a suitable solvent, to vinyl base resin, and plasticizer being added separately.

By this method, it is possible to produce a laminated structure for shielding against solar radiation having high solar radiation blocking characteristics and a low haze value at inexpensive production costs.

By this method, since adhesive property between the intermediate film sheet not containing fine particles functioning to block solar radiation and two pieces of sheets to be laminated selected from sheet-glass and plastic can be increased, it is desirable that strength of the laminated structure for shielding against solar radiation be appropriately increased.

Furthermore, it is possible to form an intermediate layer by preparing PET film (polyethylene terephthalate) having Al film, Ag film, or the like formed by sputtering or the like at least on one surface, for instance, and form an intermediate layer by allowing the PET film between the above-described intermediate films, and add a suitable additive to an intermediate film sheet not containing fine particles functioning to block solar radiation. By these intervention of film and addition of additives, addition of functions such as UV cutting, color tone adjustment, and the like can be performed.

FIG. 3 shows a sectional view of an example of a laminated structure for shielding against solar radiation relating the Embodiment A-2. As shown in FIG. 3, the laminated structure for shielding against solar radiation sandwiches an intermediate layer 2 between two pieces of sheets 1 to be laminated. The intermediate layer 2 is formed by sandwiching an intermediate film 11 having a solar radiation function and containing fine particles 11 dispersed therein, between intermediate films 12 having the solar radiation function and not containing the fine particles.

Embodiment B-2

A laminated structure for shielding against solar radiation in which plastic containing fine particles functioning to block solar radiation at least one side of the laminated sheet, and an intermediate layer is formed with two or more layers of intermediate films, and at least one layer of the intermediate films containing fine particles functioning to block solar radiation can be produced in the same manner as Embodiment A-2 except that at least one of two pieces of sheet-glass and plastic not containing fine particles functioning to block solar radiation is replaced by plastic containing fine particles functioning to block solar radiation.

Through this procedure, it is possible to produce a laminated structure for shielding against solar radiation having high solar radiation blocking characteristics and a low haze value at inexpensive production costs.

By this method, since adhesion strength between the intermediate film sheet not containing fine particles functioning to block solar radiation and two pieces of sheets to be laminated selected from sheet-glass and plastic can be increased similarly to A-2, it is desirable that strength of the laminated structure for shielding against solar radiation be appropriately increased.

Embodiment A-3

A laminated structure for shielding against solar radiation which uses sheet-glass or plastic not containing fine particles functioning to block solar radiation as a sheet to be laminated, and an intermediate layer includes a solar radiation blocking layer containing fine particles functioning to block solar radiation formed in the inner surface of at least one side of sheet-glass or plastic and an intermediate film overlapping with the solar radiation blocking layer can be produced as follows, for instance.

A suitable binder component (an inorganic binder such as silicate and the like or an organic binder such as acrylic base, vinyl base or urethane base and the like) is combined to an additive solution in which fine particles functioning to block solar radiation are dispersed in plasticizer or in a suitable solvent to prepare a coating solution. A solar radiation blocking film is formed on a surface positioned in the inner side of at least one of sheet-glass or plastic using this coating solution. Then, a resin composition not containing fine particles functioning to block solar radiation is molded in a sheet-shape to obtain an intermediate film sheet. By sandwiching the intermediate film sheet between the inside surface of at least one side of sheet-glass or plastic on which the solar radiation blocking film is formed and the other sheet glass or plastic on which no solar radiation blocking film is formed and bonding together to obtain a laminated structure for shielding against solar radiation.

By this method, it is possible to set the film thickness of the solar radiation blocking film in the laminated structure for shielding against solar radiation to be thin. Since the solar radiation blocking film exhibits reflection effect as well as absorption effect of infrared rays by setting the film thin, it is possible to improve the solar radiation blocking characteristics of the laminated structure for shielding against solar radiation. By this method, it is possible to produce a laminated structure for shielding against solar radiation having high solar radiation blocking characteristics and a low haze value at inexpensive production costs.

Furthermore, by adding suitable additives to an intermediate film sheet not containing fine particles functioning to block solar radiation, addition of functions such as UV cutting, color tone adjustment, and the like can be performed.

FIG. 4 shows a sectional view of one example of the laminated structure for shielding against solar radiation relating to the Embodiment A-3. As shown in FIG. 4, the laminated structure for shielding against solar radiation sandwiches an intermediate layer 2 with two pieces of sheets 1 to be laminated. The intermediate layer 2 includes the solar radiation blocking film 13 containing fine particles 11 functioning to block solar radiation formed on the intermediate film 12 not containing fine particles functioning to block solar radiation.

Embodiment B-3

A laminated structure for shielding against solar radiation which uses plastic containing fine particles functioning to block solar radiation as at least one of the laminated sheets and an intermediate layer includes a solar radiation blocking layer containing fine particles functioning to block solar radiation formed on the inner surface of at least one of sheet glass or plastic, and an intermediate film overlapped with the solar radiation blocking layer can be produced in the same manner as Embodiment A-3 except that at least one of two pieces of sheet-glass and plastic not containing fine particles functioning to block solar radiation is replaced by plastic containing fine particles functioning to block solar radiation.

By this method, it is possible to set the film thickness of the solar radiation blocking film in the laminated structure for shielding against solar radiation to be thin similarly to A-3. Since the solar radiation blocking film exhibits reflection effect as well as absorption effect of infrared rays by setting the film thickness thin, it is possible to improve the solar radiation blocking characteristics of the laminated structure for shielding against solar radiation. By this method, it is possible to produce a laminated structure for shielding against solar radiation having high solar radiation blocking characteristics and a low haze value at inexpensive production costs.

Furthermore, by adding suitable additives to a sheet for an intermediate film not containing fine particles functioning to block solar radiation, addition of functions such as UV cutting, color tone adjustment, and the like can be performed.

Embodiment A-4

A laminated structure for shielding against solar radiation which uses sheet-glass or plastic not containing fine particles functioning to block solar radiation as a sheet to be laminated, and an intermediate layer includes a solar radiation blocking layer containing fine particles functioning to block solar radiation formed on one surface of a ductile resin film substrate or inside a ductile film substrate and an intermediate film stacked by two or more layers is produced as follows, for instance.

(a) The case when the intermediate layer includes a solar radiation blocking layer containing fine particles functioning to block solar radiation formed on one surface of a ductile resin film substrate and an intermediate film stacked by two or more layers will be explained.

For instance, a solar radiation blocking film is formed on one surface of a ductile resin film using a coating solution in which fine particles functioning to block solar radiation are dispersed in plasticizer or suitable solvent, or a coating solution prepared by formulating an appropriate binder component (an inorganic binder such as silicate and the like or an organic binder such as acrylic base, vinyl base or urethane base and the like) to the above-described additive solution. When a solar radiation blocking film is formed on one surface of the ductile resin film substrate, a surface treatment such as corona treatment, plasma treatment, flame treatment, primer layer coating treatment and so on may be given in advance to the resin film surface to improve a binding property with the resin binder. Next, a vinyl base resin composition not containing fine particles functioning to block solar radiation is molded in a sheet-shape to obtain an intermediate film sheet. It is desirable to use two pieces of this intermediate film sheets, a ductile resin film substrate on which a solar radiation blocking layer is formed on one surface thereof, or a ductile resin film substrate containing fine particles functioning to block solar radiation in the inside thereof, is disposed between the intermediate film sheets to be an intermediate layer. This is because by adopting this structure, it is possible to avoid coming up of a problem concerning an adhesive property between a ductile resin film substrate on one surface of which a solar radiation blocking layer is formed or a ductile resin film substrate containing fine particles functioning to block solar radiation in the inside thereof. It is needless to say that fine particles functioning to block solar radiation or appropriate additives having UV cutting, color tone adjustment, and the like, can be contained on one layer of two or more layers of laminated intermediate films.

(b) The case when an intermediate layer includes a solar radiation blocking layer containing fine particles functioning to block solar radiation in the inside of a ductile film substrate, and an intermediate film stacked by two or more layers will be explained.

A ductile resin is heated at a temperature near its melting point (about 200 to 300° C.) to mix with fine particles functioning to block solar radiation. Furthermore, a mixture of the ductile resin and fine particles functioning to block solar radiation is palletized to form films or boards and the like by a predetermined method. For instance, extrusion molding, inflation molding, solution casting, casting method and the like can be used for molding. The thickness of the film, board or the like can be suitably selected according to its purpose of application. The amount of fine particles functioning to block solar radiation to be added to the ductile resin can be varied depending on required optical characteristics and mechanical characteristics, but, in general, it is desirable to be 50% by weight or less to the resin. Then, a vinyl base resin composition not containing fine particles functioning to block solar radiation is molded into a sheet-shape to obtain an intermediate film sheet. The ductile resin film containing fine particles functioning to block solar radiation is disposed between two pieces of the intermediate film sheets to obtain an intermediate layer. The method to sandwich the intermediate layer between two pieces of sheets to be laminated selected from sheet-glass and plastic and bond together is cited. It is needless to say that fine particles functioning to block solar radiation can be contained in one layer among intermediate films stacked by two or more layers.

Furthermore, if desired, appropriate additives having an effect such as UV cutting, color tone adjustment, or the like can be freely and easily added to the intermediate film not containing fine particles having the solar radiation blocking function so that a multifunctional laminated structure for shielding against solar radiation can be obtained.

By the methods explained in (a) and (b), the thickness of the solar radiation blocking film in the laminated structure for shielding against solar radiation can be set thin. By setting the film thickness thin, since the solar radiation blocking film exhibits reflection effect as well as absorption effect of infrared rays, it is possible to improve the solar radiation blocking characteristics. Thereby, the laminated structure for shielding against solar radiation having high solar radiation blocking characteristics, a low haze value can be produced at inexpensive production costs.

Furthermore, by adding suitable additives to the intermediate film sheet not containing fine particles functioning to block solar radiation, addition of functions such as UV cutting, color tone adjustment, and the like can be performed.

FIG. 5 shows a sectional view of one example of the laminated structure for shielding against solar radiation relating to the Embodiment A-4(a). As shown in FIG. 5, the laminated structure for shielding against solar radiation sandwiches an intermediate layer 2 with two pieces of sheets 1 to be laminated. The intermediate layer 2 is structured such that a solar radiation blocking film 13 containing fine particles 11 functioning to block solar radiation is formed on a ductile resin film 14, and a laminate of the resin film-and the solar radiation blocking film is sandwiched between intermediate films 12 not containing fine particles functioning to block solar radiation.

FIG. 6 shows a sectional view of one example of the laminated structure for shielding against solar radiation relating to the Embodiment A-4(b). As shown in FIG. 6, the laminated structure for shielding against solar radiation sandwiches an intermediate layer 2 with two pieces of sheets 1 to be laminated. The intermediate layer 2 is structured such that a ductile resin film 15 containing fine particles 11 functioning to block solar radiation is sandwiched between intermediate films 12 not containing fine particles functioning to block solar radiation.

Embodiment B-4

A laminated structure for shielding against solar radiation which uses plastic containing fine particles functioning to block solar radiation as at least one of the laminated sheets and an intermediate layer includes a solar radiation blocking layer containing fine particles functioning to block solar radiation formed on one surface of a ductile resin film substrate and an intermediate film stacked by two or more layers, or the intermediate layer includes a solar radiation blocking layer containing fine particles functioning to block solar radiation formed inside a ductile film substrate and the intermediate film stacked by two or more layers, can be produced in the same manner as Embodiment A-4 except that at least one of two pieces of sheet-glass and plastic not containing fine particles functioning to block solar radiation is replaced by plastic containing fine particles functioning to block solar radiation.

By this method, it is possible to set the film thickness of the solar radiation blocking film in the laminated structure for shielding against solar radiation to be thin similarly to A-4. Since the solar radiation blocking film exhibits reflection effect as well as absorption effect of infrared rays by setting the film thickness thin, it is possible to improve the solar radiation blocking characteristics. Thereby, it becomes possible to produce a laminated structure for shielding against solar radiation having high solar radiation blocking characteristics and a low haze value at inexpensive production costs.

Furthermore, by adding suitable additives to a sheet for an intermediate film not containing fine particles functioning to block solar radiation, addition of functions such as UV cutting, color tone adjustment, and the like can be performed.

Embodiment A-5

A laminated structure for shielding against solar radiation which uses sheet-glass or plastic not containing fine particles functioning to block solar radiation as a sheet to be laminated, and an intermediate layer includes a solar radiation blocking layer containing fine particles functioning to block solar radiation on one surface of an intermediate film can be produced as follows, for instance.

A suitable binder component (an inorganic binder such as silicate and the like and an organic binder such as acrylic base, vinyl base or urethane base organic binder and the like) is combined to an additive solution in which fine particles functioning to block solar radiation are dispersed in plasticizer or suitable solvent to prepare a coating solution. A solar radiation blocking film is formed by applying the coating solution on one surface of an intermediate film sheet which is made by molding a resin composition not containing fine particles functioning to block solar radiation in a sheet-shape to obtain a solar radiation blocking film. By sandwiching the intermediate film of the solar radiation blocking film between two pieces of sheets to be laminated selected from sheet-glass and plastic and bonding together to obtain a laminated structure for shielding against solar radiation.

By this method, since a film containing fine particle functioning to block solar radiation is formed on the surface of an intermediate film sheet, it is possible to further add additives such as fillers and the like to the fine particles having the function to block solar radiation in compliance with necessity, so that solar radiation blocking characteristics can be improved. By this method, it is possible to produce a laminated structure for shielding against, solar radiation having high solar radiation blocking characteristics and a low haze value at inexpensive production costs.

Embodiment B-5

A laminated structure for shielding against solar radiation which uses plastic containing fine particles functioning to block solar radiation as at least one of the laminated sheets, and an intermediate layer includes a solar radiation blocking layer containing fine particles functioning to block solar radiation on one surface of an intermediate film can be produced in the same manner as Embodiment A-5 except that at least one of two pieces of sheet-glass and plastic not containing fine particles functioning to block solar radiation is replaced by plastic containing fine particles functioning to block solar radiation.

By this method, since the film containing fine particle functioning to block solar radiation is formed on the surface of the intermediate film sheet, it is possible to further add additives such as fillers and the like to the fine particles having the function to block solar radiation in compliance with necessity, so that solar radiation blocking characteristics can be improved. By this method, it is possible to produce a laminated structure for shielding against solar radiation having high solar radiation blocking characteristics and a low haze value at inexpensive production costs.

Embodiment A-6

A laminated structure for shielding against solar radiation which uses sheet-glass or plastic not containing fine particles functioning to block solar radiation as a sheet to be laminated, and has an intermediate layer formed of a laminated body having an adhesive layer, the solar radiation blocking layer containing fine particles functioning to block solar radiation, and a peeling layer, stacked in this order wherein the adhesive layer is adhered on one inner surface of two sheets to be laminated selected from the sheet-glass and plastic, and the intermediate layer further includes an intermediate film or laminated intermediate film stacked with two or more layers, overlapping with the laminated body on the peeling layer side of the laminated body (that is, the laminated structure for shielding against solar radiation has a structure of "one of the sheet to be laminated/an adhesive layer/a solar radiation blocking layer containing fine particles functioning to block solar radiation/a peeling layer/an intermediate film or an intermediate film stacked by two or more layers/the other sheet to be laminated) is produced, for instance, as below, of which processes are explained using from FIGS. 7(A) to 7(C). FIGS. 7(A) to 7(C) show sectional views for the production processes of one example of the laminated structure for shielding against solar radiation relating to

Embodiment A-6

First, as shown in FIG. 7(A), a peeling layer 16 (for instance, wax, acrylic resin and polyvinyl acetal represented by polyvinyl butyral) is formed on one surface of a film sheet 17 (for instance, synthetic resin film such as polyester, polypropylene, polyethylene, polyethylene terephthalate, polycarbonate, polyimide, fluorine, and so on, paper, cellophane or the like can be cited), and a solar radiation blocking layer 13 containing fine particles 11 functioning to block solar radiation is formed on the peeling layer. Then, an adhesive layer 18 (for instance, polyvinyl acetal represented by polyvinyl butyral, polyvinyl chloride, polyvinyl chloride-ethylene copolymer, vinylchloride-ethylene-glycidyl methacrylate copolymer, vinyl chrolide-ethylene-glycidyl acrylate copolymer, polyvinylidene chloride, vinylidene chloride-acrylonitrile copolymer, polyamide, polymethacrylic acid ester, acrylic ester copolymer, and the like can be cited) is formed on the solar radiation blocking layer to make a laminated body to obtain a transfer film 19.

After the adhesive layer 18 of the transfer film 19 is adhered under pressure to the inner surface of one of sheet glass or plastic sheet 1 to be laminated, the film sheet 17 is peeled off from the transfer film. Owing to the effect of the peeling layer 16, only the film sheet 17 is peeled off from the laminated body. This is shown in FIG. 7(B).

After peeling off of the film sheet 17, by adhering the inner surface of the other sheet-glass or plastic to be laminated under pressure while sandwiching the above-described intermediate film 12 or an intermediate film stacked by two or more layers, the laminated structure for shielding against solar radiation shown in FIG. 7(C) is obtained.

As a result, one example of the laminated structure for shielding against solar radiation relating obtained (Embodiment A-6) is formed by sandwiching the intermediate layer 2 with two pieces of the sheets 1 to be laminated as shown in FIG. 7(C). The intermediate layer 2 is formed by the intermediate film 12 not containing fine particles, the peeling layer 16, the solar radiation blocking film 13 containing fine particles 11 functioning to block solar radiation, and the adhesive layer 18.

By this method, it is possible to easily produce a thin solar radiation blocking layer and by adding suitable additives to the intermediate film, the peeling layer, or the adhesive layer, addition of functions such as UV cutting, color tone adjustment, and the like can be performed.

Embodiment B-6

A laminated structure for shielding against solar radiation which uses plastic containing fine particles functioning to block solar radiation as at least one of the laminated sheets and has an intermediate layer formed of a laminated body having an adhesive layer, the solar radiation blocking layer containing fine particles functioning to block solar radiation, and a peeling layer, stacked in this order wherein the adhesive layer is adhered on one inner surface of two pieces of sheets to be laminated selected from the sheet-glass and plastic, and the intermediate layer further includes an intermediate film or laminated intermediate film stacked with two or more layers, overlapping with the laminated body on the peeling layer side of the laminated body (that is, the laminated structure for shielding against solar radiation has a structure of "one of the sheet to be laminated/an adhesive layer/a solar radiation blocking layer containing fine particles functioning to block solar radiation/a peeling layer/an intermediate film or an intermediate film stacked by two or more layers/the other sheet to be laminated) can be produced in the same manner as Embodiment A-6 except that at least one of two pieces of sheet-glass and plastic not containing fine particles functioning to block solar radiation is replaced by plastic containing fine particles functioning to block solar radiation.

By this method also, it is possible to easily produce a thin solar radiation blocking layer and by adding suitable additives to the peeling layer, or the adhesive layer, addition of functions such as UV cutting, color tone adjustment, and the like can be performed.

Embodiment B-7

A laminated structure for shielding against solar radiation which uses plastic containing fine particles functioning to block solar radiation at least as one laminated sheet and has an intermediate layer formed of an intermediate film not containing fine particles functioning to block solar radiation, but containing vinyl base resin, for instance, can be produced as below, for instance. A vinyl base resin composition is prepared by adding plasticizer into vinyl base resin, and the vinyl base resin composition is molded into a sheet-shape to obtain an intermediate film sheet. Plastic is used at least as one sheet to be laminated for the intermediate film sheet, and glass-sheet or plastic can be used as the other sheet to be laminated.

By this method, it is possible to produce a laminated structure for shielding against solar radiation having high solar radiation blocking characteristics and a low haze value. Furthermore, this method can easily produce a laminated structure for shielding against solar radiation at inexpensive production costs.

Furthermore, by adding suitable additives to the intermediate film and/or plastic for the other sheet to be laminated, addition of functions such as UV cutting, color tone adjustment, and the like can be performed.

FIG. 8 shows a sectional view of one example of the laminated structure for shielding against solar radiation relating to Embodiment B-7. As shown in FIG. 8, the laminated structure for shielding against solar radiation sandwiches an intermediate layer 2 with a sheet 20 to be laminated containing fine particles 11 functioning to block solar radiation and a sheet 1 to be laminated not containing the fine particles. The intermediate layer 2 is formed by an intermediate film 12 not containing fine particles functioning to block solar radiation.

(Method of Producing a Laminated Structure for Shielding Against Solar Radiation)

The method to disperse the above-described fine particles functioning to block solar radiation into plasticizer or suitable solvent is optional so far as it is a method to uniformly disperse the fine particles into plasticizer or suitable solvent. For instance, methods such as beads mill, ball mill, sand mill, ultrasonic dispersion, and the like can be cited, and by uniformly dispersing the above-described fine particles into plasticizer or suitable solvent, the above-described additives or coating solution applied to produce the laminated glass for shielding against solar radiation of the present invention can be prepared.

A solvent to disperse the above-described fine particles functioning to block solar radiation is not particularly limited, it is possible to appropriately select the solvent according to conditions to form a solar radiation blocking film or vinyl resin or the like to be composed for preparing vinyl base resin composition. For instance, water, various organic solvent like alcohols such as ethanol, propanol, butanol, isopropyl alcohol, isobutyl alcohol, diacetone alcohol, and the like, ethers such as methyl ether, ethyl ether, propyl ether, and the like, esters, ketones such as acetone, methyl ethyl ketone, diethyl ketone, cyclohexanone, isobutyl ketone, and the like can be used. It is possible to adjust the pH by adding acid or alkali, as necessary. Needless to say, it is possible to add various kinds of surface active agents, coupling agents and the like to further improve the dispersion stability of the fine particles in the coating solution.

As the plasticizer to adjust plasticity of the above-described vinyl base resin, there is no particular limitation, and for instance, dioctyl phthalate, dibutyl phthalate, diisobutyl phthalate, di(2-ethylhexyl) adipate, diisobutyl adipate, epoxy fatty acid monoester, triethylene glycol di-2-ethylbutylate, triethylene glycol-di-2-ethyl hexoate, sebacitic acid dibutyl ester, dibutyl sebacate, and so on can be cited.

As the above-described vinyl base resin, for instance, polyvinyl acetal, polyvinylchloride, vinylchloride-ethylene copolymer, vinylchloride-ethylene-glycidylmethacrylate copolymer, vinylchloride-ethylene-glycidylacrylate copolymer, vinylchloride-glycidyl methacrylate copolymer, vinylchloride-glycidylacrylate copolymer, poly vinylidene chloride, vinylidenechloride-acrylonitrile copolymer, polyvinylacetate, ethylene-vinylacetate copolymer, ethylene-vinylacetate copolymer, a mixture of polyvinylacetal and polyvinylbutyral, and the like represented by polyvinyl butyral can be cited. It is especially desirable to use polyvinyl acetal or ethylene-vinylacetate copolymer represented by polyvinyl butyral from a point of view such as adhesive property of glass or plastics, transparency, safety or the like.

As a method to form an intermediate film sheet containing fine particles functioning to block solar radiation or an intermediate film sheet not containing fine particles functioning to block solar radiation, well-known methods are used, for instance a calendar roll method, extrusion method, casting method, inflation method or the like can be used. Especially, in the former intermediate film sheet containing fine particles functioning to block solar radiation and vinyl base resin composition, the above-described vinyl base resin composition is formed by adding, for instance, an additive solution in which fine particles functioning to block solar radiation are dispersed into plasticizer to vinyl base resin and kneading to disperse the fine particles uniformly, so that thus prepared vinyl base resin composition is formed in a sheet shape. When forming the vinyl base resin composition into a sheet shape, it is acceptable to combine a thermal stabilizer, antioxidant, ultraviolet ray blocking agent, as necessary, and combine an adhesive strength adjusting agent (for instance, metal salt) to control the transmittance of the sheet. The method of production of the laminated structure of the present invention is not particularly limited so far as it takes a configuration of the above described laminated structure.

(Method of Producing a Liquid Dispersion for Forming a Solar Radiation Blocking Material)

A method of producing a liquid dispersion for forming a solar radiation blocking material suitably applicable to a laminated structure for shielding against solar radiation will be explained.

A liquid dispersion for forming a solar radiation blocking material relating to the present invention includes a solvent and fine particles for shielding against solar radiation and a liquid dispersion for forming a solar radiation blocking material by dispersing the fine particles for shielding against solar radiation into the solvent. The fine particles for shielding against solar radiation is formed by fine particles of tungsten oxide expressed by previously described general formula $W_yO_z$ where $2.0<x/y<3.0$ and/or fine particles of composite tungsten oxide expressed by the general formula $M_xW_yO_z$ where $0.001 \leq x/y \leq 1$, and $2.0<z/y \leq 3.0$. The powder containing the fine particles for shielding against solar radiation is fine particles of tungsten oxide of which powder color in the $L^*a^*b^*$ calorimetric system is in the range between 25 to 80 for $L^*$, $-10$ to 10 for $a^*$, and $-15$ to 15 for $b^*$. The diameter of tungsten oxide fine particles dispersed in the solvent is 800 nm or less. It is possible to obtain a solar radiation blocking material having high solar radiation blocking characteristics by applying a liquid dispersion for forming a solar radiation blocking material in which fine particles of tungsten oxide dispersed in the solvent is sufficiently fine as to 800 nm or less in diameter and uniformly dispersed.

Dispersion particle diameter of the tungsten oxide fine particles in the liquid dispersion for forming a solar radiation blocking material will be briefly explained. The dispersion particle diameter of the tungsten oxide fine particles means the diameter of a flocculation particle formed by flocculating the tungsten oxide fine particles dispersed in the solvent, and can be measured with various commercial particle size distribution meter. It can be determined by collecting, for instance, a sample in a state where elements or aggregates of tungsten oxide fine particles exist from liquid dispersion of tungsten oxide fine particles, to measure with ELS-8000 manufactured by Otsuka Electronics Co., Ltd designed based on the principle of dynamic light scattering method.

In the liquid dispersion for forming solar radiation blocking material, it is desirable that the diameter of a dispersed particle of the tungsten oxide fine particle be 800 nm or less. When the dispersed particle diameter is 800 nm or less, it is possible to avoid the obtained solar radiation blocking material to become a grayish film or mold (plate, sheet, and the like) which has decreased transmittance monotonously, and shows high solar radiation blocking characteristics. Furthermore, it is desirable not to contain a large amount of bulkily grown particles aggregated from the liquid dispersion to form the solar radiation blocking material, because, if not, it can avoid to generate haze due to light scattering caused by these bulkily grown particles and due to decreasing of visible light transmittance.

It should be noted that the method of dispersing fine particles of the tungsten oxide into a solvent is not limited so far as it can disperse uniformly, and a treatment method of crashing and dispersing by using, for instance, beads mill, ball mill, sand mill, paint shaker, ultrasonic homogenizer, and the like can be cited. By dispersion treatment using these machines, pulverization by collision between tungsten oxide fine particles and the like progresses as well as dispersion of the tungsten oxide fine particles into the solvent, tungsten oxide particles can be dispersed in finer particles (progress of crashing and dispersing).

Furthermore, it is a desirable condition to add oxide fine particles containing two kinds or more elements selected from Sb, V, Nb, Ta, W, Zr, F, Zn, Al, Ti, Pb, Ga, Re, Ru, P, Ge, In, Sn, La, Ce, Pr, Nd, Gd, Th, Dy, Ho, Y, Sm, Eu, Er, Tm, Th, Lu, Sr, Ca, Or, boride fine particles expressed by the general formula $XB_m$ where X is an element selected from an rare-earth element containing an alkaline-earth metal element or yttrium (Y), B is boron, satisfying $4 \leq m < 6.3$.

Or, at least one kind of fine particles selected from fine particles of indium tin composite oxide such as $In_4Sn_3O_{12}$ or the like to the liquid dispersion for forming a solar radiation blocking material, and disperse them into a solvent in the liquid dispersion.

By this composition, it is possible to obtain effects of improvement in solar radiation blocking characteristics of a solar radiation blocking material, adjustment of color tone of the solar radiation blocking material, reduction of amount of additive fillers, or the like. However, from the viewpoint of improvement in the solar radiation blocking characteristics, it is desirable to use oxide fine particles containing two kinds or more elements selected from Sb, V, Nb, Ta, W, Zr, F, Zn, Al, Ti, Pb, Ga, Re, Ru, P, Ge, In, Sn, La, Ce, Pr, Nd, Gd, Th, Dy, Ho, Y, Sm, Eu, Er, Tm, Th, Lu, Sr, Ca, or fine particles of indium tin composite oxide, and from view points of color tone adjustment and reduction of additive fillers, it is desirable to use boride fine particles. Furthermore, from a viewpoint of improvement in shielding characteristics against near-infrared rays which are closer to the visible light, boride fine particles are desirable. Note that the rate of addition at this time can be appropriately selected according to desired solar radiation blocking characteristics.

A liquid dispersion for forming the solar radiation blocking material can be formed by containing an inorganic binder and/or resin binder. The kind of the inorganic binder or resin binder is not particularly limited. For instance, as the inorganic binder, silicon, zirconium, titan, or metal alkoxide of aluminum or these partial hydrolysis condensation polymerization substances or organosilazane can be cited, and as the resin binder, thermoplastic resin such as acrylic resin, or thermosetting resin such as epoxy resin or the like can be used.

Furthermore, in the liquid dispersion for forming solar radiation blocking material, a solvent to disperse tungsten oxide fine particles is not particularly limited, it can be suitably selected according to coating and threading conditions, coating and threading environment, and further, according to binder in the case of containing inorganic binder or resin binder.

As the solvent, it is possible to use water, and various organic solvent like alcohols such as ethanol, propanol, butanol, isopropyl alcohol, isobutyl alcohol, diacetone alcohol, and the like, ethers such as methyl ether, ethyl ether, propyl ether, and the like, esters, ketones such as acetone, methyl ethyl ketone, diethyl ketone, cyclohexanone, isobutyl ketone, and the like. It is possible to adjust the pH by adding acid or alkali, as necessary. Needless to say, it is also possible to add various kinds of surface active agents, coupling agents and the like to further improve the dispersion stability of the fine particles in the coating solution.

Furthermore, when a film is formed on a transparent substrate using the afore-mentioned liquid dispersion for forming the solar radiation blocking material, the conductivity of the film is obtained along a conductive path via contact portion of the tungsten oxide fine particles. Accordingly, for instance, by adjusting the amount of a surface active agent or coupling agent in the liquid dispersion for forming solar radiation blocking material, it is possible to partially cut the conductive path and it is easy to reduce conductivity of the film by making the value of surface electric resistance to $10^6 \Omega/\square$ or more. Furthermore, it is possible to control conductivity of the film by adjusting inorganic binder and/or resin binder in the liquid dispersion for forming the solar radiation blocking material.

Next, when a film is formed by coating the liquid dispersion for forming solar radiation blocking material on a suitable transparent substrate, the coating method is not particularly limited. Any coating method such as spin coating, bar coating, spray coating, dip coating, screen printing, roll coating, flow coating, and the like can be used so far as it can apply the liquid dispersion flatly, thinly and uniformly.

When silicon, zirconium, titan, or metal alkoxide and its hydrolysis polymer is contained in the liquid dispersion for forming the solar radiation blocking material as an inorganic binder, a polymerization reaction of alkoxide or its hydrolysis polymer contained in the coating film can be almost completed by setting a substrate heating temperature after coating the liquid dispersion at 100° C. or more. By almost completing the polymerization reaction, it is possible to avoid water or an organic solvent from remaining in the film to cause reduction of visible light transmittance of the film after heating. Therefore, the heating temperature is desirably 100° C. or more, and more desirably a temperature of the boiling point or more of the solvent in the liquid dispersion.

When a resin binder is used in the liquid dispersion for forming the solar radiation blocking material, the film may be cured according to the curing method of respective resin binders. For instance, if the resin binder is an ultraviolet cured resin, ultraviolet rays can be appropriately irradiated, and if it is room-temperature cured resin, the film can be left as it is.

When the liquid dispersion for forming a solar radiation blocking material contains no resin binder nor inorganic binder, a film obtained on a transparent substrate is a film structure formed by sedimented fine particles of the tungsten oxide. This film can exhibit a solar radiation blocking effect alone. However, it is recommendable to apply a coating solution containing an inorganic binder such as silicon, zirconium, titan, or metal alkoxide or these partial hydrolysis condensation polymerization substances, or resin binder, by coating to further form films on this film to make a multi-layered film. By taking this formation, since film formation is carried out by filling up gaps in the first layer composed of sedimented fine particles of tungsten oxide with the coating component, the haze of the film lowers so as to increase the visible light transmittance, and binding property of the fine particles to the substrate material will be improved.

Since in the solar radiation blocking material relating to the present invention structured with a transparent substrate and a film formed on this substrate, fine particles of tungsten oxide are appropriately dispersed in the film, reflection in the visible light region is less compared with an oxide thin film having a mirror surface due to crystal being compactly buried in the film formed by a physical film forming method, so that it can avoid a glaring appearance. At the same time, since it has a plasma frequency in the region from visible light region to the near-infrared region, plasma reflection owing to this plasma frequency increases to make the solar radiation shieldability excellent.

When further restraint on reflection of the film in the visible light region is required, a multi-layered film having visual reflectance of 1% or less can be easily obtained by forming a film with a low refractive index such as $SiO_2$ or $MgF_2$ on the film in which tungsten oxide fine particles are dispersed.

In order to add a function to block ultraviolet rays to the solar radiation blocking material relating to the present invention, it is also possible to add at least one or more kinds of inorganic titan oxide, zinc oxide or cerium oxide particles, organic benzophenone, benzotriazole or the like.

Furthermore, in order to improve visible light transmittance of the solar radiation blocking film, it is possible to mix particles of ATO, ITO, aluminum added zinc oxide, indium tin composite oxide, or the like. Since while increase of addition amount of these transparent particles increases the transparency in the vicinity of 750 nm, the transparent particles block near-infrared rays, a solar radiation blocking material having high in visible light transparency and high in solar radiation blocking characteristics can be obtained.

EXAMPLE

Examples of the present invention will be concretely explained together with a comparative example below. However, the present invention is not limited to the following examples. Note that in the examples and comparative example, a term "laminated structure for shielding against solar radiation" is abbreviated to "laminated structure".

It should be noted that powder color (a field of view: 10°, a light source D65) of tungsten oxide fine particles and composite tungsten oxide fine particles, and visible light transmittance and solar radiation transmittance of the laminated structure in respective examples, are measured by a spectrophotometer U-4000 manufactured by Hitachi Co., Ltd. The haze value is measured using HR-200 manufactured by Murakami Color Research Laboratory.

Example 1

A quartz boat putting 50 g of $H_2WO_4$ inside was set in a quartz tubular furnace and heated while 5% $H_2$ gas was supplied with $N_2$ gas as a carrier. After reduction treatment at 600° C., for one hour, fine particles "a" was obtained by firing at 800° C., for 30 minutes under $N_2$ gas atmosphere. The powder color of the fine particles "a" was 36.9288 for L*, 1.2573 for a*, and −9.1526 for b*, and it was found that the fine particles "a" were in $W_{18}O_{49}$ single phase as a result of crystal phase identification by the X-ray diffraction powdered method.

Next, 5 wt % of the fine particles "a", 5 wt % of polymer base dispersing agent, 90 wt % of dipropylene glycol monomethylether were measured, and a liquid dispersion (liquid A) for forming a solar radiation blocking material was prepared by crashing and dispersing for 6 hours with a paint shaker containing 0.3 mm ψ $ZrO_2$ beads. Here, by measuring dispersing particle diameter of tungsten oxide fine particles in the liquid dispersion (liquid A) for forming a solar radiation blocking material, it was found to be 80 nm.

Next, obtained liquid dispersion (liquid A) was added to polyvinyl butyral, and triethylene glycol di-2-ethylbutylate as plasticizer to prepare an intermediate film composition so that the concentration of the fine particles "a" was 0.0366 wt %, and the concentration of polyvinylbutyral was 71.1 wt %. Thus prepared composition was kneaded with a roll and molded into a sheet of 0.76 mm in thickness to prepare an intermediate film. After thus prepared intermediate film was sandwiched between two pieces of green glass substrates of 100 mm×100 mm×about 2 mm in thickness and heated to 80° C. to be temporarily adhered. Then, final bonding was performed using an autoclave of 140° C., and 14 kg/cm² to prepare a laminated structure A.

As shown by a table in FIG. 1, when the visible light transmittance was 70.8%, the solar radiation transmittance was 47.6%, and the haze value was 0.4%.

Examples 2 and 3

A laminated structure B relating to Example 2 was prepared in the same manner as in Example 1 except one piece of green glass out of two pieces was replaced by clear glass, and a laminated structure C relating to Example 3 was prepared in the same manner as in Example 1 except one piece of green glass out of two pieces was replaced by polycarbonate.

As shown by the table in FIG. 1, when the visible light transmittance of the laminated structure B in Example 2 was 72.0%, the solar radiation transmittance was 49.4%, and the haze value was 0.3%, and when the visible light transmittance of the laminated structure C in Example 3 was 75.8%, the solar radiation transmittance was 47.8%, and the haze value was 0.4%.

Examples 4 to 6

A laminated glass structure D relating to Example 4 was prepared in the same manner as in Example 1 except that powder prepared by thoroughly mixing 50 g of $H_2WO_4$ and 21.3 g of $Al(OH)_3$ (corresponding to Al/W=0.2) with an agate mortar was heated while supplying 5% $H_2$ gas using $N_2$ gas as a carrier, and after reduction treatment at 600° C. for one hour, it was fired at 800° C., for 30 minutes under $N_2$ gas atmosphere to obtain fine particles "b" (the powder color of the fine particles b was 38.6656 for L*, 0.5999 for a*, and −6.9896 for b*).

A laminated glass structure E relating to Example 5 was prepared in the same manner as in Example 1 except that powder prepared by thoroughly mixing 50 g of $H_2WO_4$ and 17.0 g of $Cu(OH)_2$ (corresponding to Cu/W=0.3) with an agate mortar was heated while supplying 5% $H_2$ gas using $N_2$ gas as a carrier, and after reduction treatment at 600° C. for one hour, it was fired at 800° C., for 30 minutes under $N_2$ gas atmosphere to obtain fine particles "c" (the powder color of the fine particles "c" was 35.2745 for L*, 1.4918 for a*, and −5.3118 for b*).

A laminated glass structure F relating to Example 6 was prepared in the same manner as in Example 1 except that powder prepared by thoroughly mixing 50 g of $H_2WO_4$ and 11.3 g of $Cu(OH)_2$ (corresponding to Cu/W=0.2) with an agate mortar was heated while supplying 5% $H_2$ gas using $N_2$ gas as a carrier, and after reduction treatment at 600° C. for one hour, it was fired at 800° C., for 30 minutes under $N_2$ gas atmosphere to obtain fine particles "d" (the powder color of the fine particles "c" was 35.2065 for L*, 1.9305 for a*, and −6.9258 for b*).

As shown by the table in FIG. 1, when the visible light transmittance of the laminated structure D in Example 4 was 71.0%, the solar radiation transmittance was 42.6%, and the haze value was 0.4%, and when the visible light transmittance of the laminated structure E in Example 5 was 70.9%, the solar radiation transmittance was 41.4%, and the haze value was 0.4%. When the visible light transmittance of the laminated structure F in Example 6 was 71.0%, the solar radiation transmittance was 39.9%, and the haze value was 0.4%.

Example 7

7.7 wt % of the fine particles "a", 9.1 wt % of polymer base dispersing agent, 7.7 wt % of acrylic resin, 75.5 wt % of methylisobutylketone were measured and a liquid dispersion (liquid B) for forming a solar radiation blocking material was prepared by crashing and dispersing for 6 hours with a paint shaker containing 0.3 mmψ $ZrO_3$ beads. Here, dispersing particle diameter of tungsten oxide fine particles in the liquid dispersion (liquid B) for forming a solar radiation blocking material was measured, and it was found to be 82 nm.

After applying the above-described liquid dispersion (liquid B) on a green glass substrate of 100 mm×100 mm×about 2 mm in thickness with a bar of count 24, it was fired at 180° C. for one hour to form a solar radiation blocking film.

Next, a green glass substrate not forming a solar radiation blocking film thereon and the afore-mentioned green glass substrate forming a solar radiation blocking film thereon were opposed to each other in a manner that the solar radiation blocking film was arranged inside, a polyvinylbutyral sheet for an intermediate film of 0.76 mm in thickness was sandwiched between the pair of green glass substrates and they were heated to 80° C. to be temporarily adhered. Then, final bonding was performed using an autoclave of 140° C., and 14 kg/cm² to prepare a laminated structure G relating to Example 7.

As shown by a table in FIG. 1, when the visible light transmittance was 73.5%, the solar radiation transmittance was 48.1%, and the haze value was 0.3%.

Example 8

A liquid dispersion (liquid C) for forming a solar radiation blocking material was prepared in the same manner as in Experiment 1 except dipropylene glycol monomethylether in the above-described liquid dispersion (liquid A) prepared according to Example 1 was replaced by toluene.

After applying the above-described liquid dispersion (liquid C) on one surface of ductile polyester film (50 μm in thickness) with a bar coater, it was dried to form a solar radiation blocking layer by irradiating with a high-power mercury lamp at 70° C. for one minute. This solar radiation blocking layer was disposed between 2 pieces of polyvinylbutyral sheets for an intermediate sheet having a thickness of 0.76 mm, and they were sandwiched between 2 pieces of green glass of 100 mm×100 mm×about 2 mm in thickness. After they were temporarily adhered by heating them to 80° C., final bonding was performed using an autoclave of 140° C., and 14 kg/cm² to prepare a laminated structure H relating to Example 8.

As shown by a table in FIG. 1, when the visible light transmittance was 71.2%, the solar radiation transmittance was 48.1%, and the haze value was 0.5%.

Example 9

A laminated glass structure I relating to Example 9 was prepared in the same manner as in Example 1 except that the polyvinylbutyral sheet for the intermediate film having a thickness of 0.76 mm prepared according to Example 1 was sandwiched between two pieces of polyvinylbutyral sheets for intermediate film not containing fine particles for shielding against solar radiation to make a three-layered structure.

As shown by a table in FIG. 1, when the visible light, transmittance was 72.3%, the solar radiation transmittance was 48.2%, and the haze value was 0.4%.

Example 10

An ethylene-vinylacetate copolymer sheet for an intermediate film having a thickness of 0.76 mm was sandwiched between a green glass with a solar radiation blocking layer which was prepared according to Example 7 on the solar radiation blocking layer side and a PET film having a thickness of 50 μm to make a bilayer glass having a structure of green glass/ethylene-vinylacetate copolymer sheet/PET film. After they were temporarily adhered by heating them to 80° C., final bonding was performed using an autoclave of 140° C., and 14 kg/cm² to prepare a laminated structure J relating to Example 10.

As shown by a table in FIG. 1, when the visible light transmittance was 71.8%, the solar radiation transmittance was 46.8%, and the haze value was 0.4%.

Example 11

30 wt % of antimony doped tin oxide (ATO) fine particles having the specific surface of 43.7 m²/g, 65 wt % of methylisobutylketone, 5 wt % of polymer base dispersing agent were mixed, and after filling it together with 0.15 mmψ glass beads into a vessel, beads mill dispersing treatment was given for 1.5 hours to prepare an ATO liquid dispersion (liquid D).

By mixing the liquid dispersion (liquid A) prepared according to Example 1 and the ATO liquid dispersion (liquid D) sufficiently so that the weight ratio of the fine particles "a" and ATO was 70:30 to prepare liquid dispersion (liquid E). After applying a liquid dispersion (liquid F) composed of thus obtained liquid dispersion (liquid E) i.e. 1.80 wt % of fine particles "a", 0.77 wt % of ATO fine particles, and 15 wt % of a cold setting binder, 70.63 wt % of methylisobutyl ketone, and 11.8 wt % polymer base dispersing agent on a green glass substrate of 100 mm×100 mm×about 2 mm in thickness and heating it to 180° C. for one hour, a solar radiation blocking glass was obtained. Then, a polyvinylbutyral sheet for intermediate film having a thickness of 0.76 mm was sandwiched between this glass substrate the other green glass substrate so that the film surface of this solar radiation blocking glass was put inside, and heated to 80° C. to be temporarily adhered. Then, final bonding was performed using an autoclave of 140° C., and 14 kg/cm² to obtain a laminated structure K relating to Example 11.

As shown by a table in FIG. 1, when the visible light transmittance was 73.5%, the solar radiation transmittance was 48.2%, and the haze value was 0.4%.

Example 12

A laminated structure L relating to Example 12 was obtained in the same manner as in Example 1 except that 20 wt % of hexaboride lantern ($LaB_6$) particles having an average particle diameter of about 1 μm, 5 wt % of polymer base dispersing agent, 75 wt % of toluene were dispersion treated for 24 hours with a paint shaker filled with 0.3 mmψ $ZrO_2$ beads to prepare a $LaB_6$ liquid dispersion (liquid G) having an average dispersion particle diameter of 86 nm. Next, by sufficiently mixing the liquid dispersion (liquid A) prepared according to Example 1 and the $LaB_6$ liquid dispersion (liquid G) so that the weight ratio of the fine particles "a" and $LaB_6$ was 80:20, liquid dispersion (liquid H) was prepared. Thus obtained liquid dispersion (liquid H) was added to polyvinylbutyral, to which triethylene glycol di-2-ethylbutyrate was added as plasticizer, and the intermediate film composition was prepared in such that the concentration of the fine particles "a" was 0.0293 wt %, that of the $LaB_6$ fine particles was 0.001 wt %, and that of polyvinylbutyral was 71.1 wt %.

As shown by a table in FIG. 1, when the visible light transmittance was 72.0%, the solar radiation transmittance was 41.1%, and the haze value was 0.3%.

Example 13

A laminated structure M relating to Example 13 was obtained in the same manner as in Example 1 except that 30 wt % of indium tin composite oxide ($In_4Sn_3O_{12}$) particles having an average particle diameter of about 4 μm, 56 wt % of methylisobutylketone, 14% of polymer base dispersing agent were mixed and after filling them into a vessel together with 0.15 mmψ glass beads and dispersion treated for one hours to prepare an $In_4Sn_3O_{12}$ composite oxide fine particles liquid dispersion (liquid I) having an average dispersion particle diameter of 50 nm.

Next, the above-described liquid dispersion (liquid A) prepared according to Example 1 and $In_4Sn_3O_{12}$ liquid dispersion (liquid I) were mixed so that the weight ratio of the fine particles a and $In_4Sn_3O_{12}$ was 85:15 to prepare the liquid dispersion (liquid I). Thus obtained liquid dispersion (liquid I) was added to polyvinylbutyral, to which triethylene glycol-di-2-ethylbutyrate was added as plasticizer, and the intermediate film composition was prepared in such that the concentration of the fine particles a was 0.031 wt %, that of the $In_4Sn_3O_{12}$ fine particles was 0.030 wt %, and that of polyvinylbutyral was 71.1 wt %.

As shown by a table in FIG. 1, when the visible light transmittance was 71.0%, the solar radiation transmittance was 46.3%, and the haze value was 0.4%.

Example 14

A laminated structure N relating to Example 14 was obtained in the same manner as in Example 1 except that in place of polyvinylbutyral, ethylene-vinylacetate copolymer was used.

As shown by a table in FIG. 1, when the visible light transmittance was 71.1%, the solar radiation transmittance was 48.0%, and the haze value was 0.4%.

Example 15

A laminated structure O relating to Example 15 was obtained in the same manner as in Example 10 except that in place of ethylene-vinylacetate copolymer for intermediate film in Example 10, polyvinylbutyral was used.

As shown by a table in FIG. 1, when the visible light transmittance was 72.0%, the solar radiation transmittance was 46.9%, and the haze value was 0.4%.

Example 16

10.8 g of $Cs_2CO_3$ is dissolved in 16.5 g of water, and this solution was added to 50 g of $H_2WO_4$. After sufficiently stirred, it was dried. Thus obtained dried substance was heated while supplying 2% $H_2$ gas, using $N_2$ gas as a carrier to fire for 30 minutes at a temperature of 800° C. and fine particles e was obtained by firing for 90 minutes at 800° C. in $N_2$ gas atmosphere. The powder color of the fine particles "e" was 37.4562 for L*, −0.3485 for a*, and −4.6939 for b*, and it was found that the fine particles "e" were in $Cs_{0.33}WO_3$ single phase as a result of crystal phase identification by the X-ray diffraction powdered method.

Next, 8 wt % of the fine particles "e", 84 wt % of toluene, 8 wt % of polymer base dispersing agent were measured and a liquid dispersion (liquid J) for forming a solar radiation blocking material was prepared by crashing and dispersing for 6 hours with a paint shaker containing 0.3 mmψ $ZrO_2$ beads. Here, dispersing particle diameter of tungsten oxide fine particles in the liquid dispersion (liquid J) for forming a solar radiation blocking material was measured, and it was found to be 62 nm. Except using thus obtained liquid dispersion (liquid J), a laminated structure P relating to Example 16 was obtained in the same manner as in Example 1.

As shown by a table in FIG. 1, when the visible light transmittance was 70.0%, the solar radiation transmittance was 35.7%, and the haze value was 0.4%.

Example 17

A laminated structure Q was prepared in the same manner as in Example 1 except that after the liquid dispersion (liquid J) for forming a solar radiation blocking material prepared according to Example 16 was added and mixed to polycarbonate resin so that the concentration of $Cs_{0.33}WO_3$ was 0.07 wt %, then, the mixture was uniformly melt and mixed with a blender and a biaxial extruder. Furthermore, it was extruded to have a thickness of 2 mm using a T-die to obtain a solar radiation blocking material (heat ray blocking polycarbonate sheet) in which $Cs_{0.33}WO_3$ fine particles were uniformly dispersed in the whole resin. This solar radiation blocking material was used as one sheet to be laminated, and between this sheet and the green glass substrate which was the other sheet to be laminated, a polyvinylbutyral sheet for intermediate film having a thickness of 0.76 mm was sandwiched.

As shown by a table in FIG. 1, when the visible light transmittance was 71.0%, the solar radiation transmittance was 39.4%, and the haze value was 0.4%.

Example 18

The same operation as in Example 17 was performed except using polyethylene terephthalate resin instead of polycarbonate resin, a solar radiation blocking material (heat ray blocking polyethylene terephthalate sheet) of 2 mm thick, and in which $Cs_{0.33}WO_3$ fine particles were uniformly dispersed in the whole resin was obtained. A laminated structure R was prepared in the same manner as in Example 1 except that this solar radiation blocking material was used as one sheet to be laminated, and between this sheet and the green glass substrate which was the other sheet to be laminated, a polyvinylbutyral sheet for intermediate film having a thickness of 0.76 mm was sandwiched.

As shown by a table in FIG. 1, when the visible light transmittance was 72.0%, the solar radiation transmittance was 40.2%, and the haze value was 0.4%.

Example 19

8.8 g of $RbNO_3$ is dissolved in 13.5 g of water, and this solution was added to 45.3 g of $H_2WO_4$. After sufficiently stirred, it was dried. Thus obtained dried substance was heated while supplying 2% $H_2$ gas, using $N_2$ gas as a carrier to fire for 30 minutes at a temperature of 800° C. and fine particles "f" was obtained by firing for 90 minutes at 800° C. in $N_2$ gas atmosphere. The powder color of the fine particles "f" was 36.3938 for L*, −0.2385 for a*, and −3.8318 for b*, and it was found that the fine particles "f" were in $Rb_{0.33}WO_3$ single phase as a result of crystal phase identification by the X-ray powdered method.

Next, 8 wt % of the fine particles "f", 84 wt % of toluene, 8 wt % of polymer base dispersing agent were measured and a liquid dispersion (liquid K) for forming a solar radiation blocking material was prepared by crashing and dispersing for 6 hours with a paint shaker containing 0.3 mmψ $ZrO_2$ beads. Here, dispersing particle diameter of tungsten oxide fine particles in the liquid dispersion (liquid K) for forming a solar radiation blocking material was measured, and it was found to be 64 nm. Except using thus obtained liquid dispersion (liquid K), a laminated structure S relating to Example 19 was obtained in the same manner as in Example 1.

As shown by a table in FIG. 1, when the visible light transmittance was 75.0%, the solar radiation transmittance was 45.0%, and the haze value was 0.3%.

Example 20

3.7 g of $KNO_3$ was dissolved in 5.6 g of water, and this solution was added to 45.3 g of $H_2WO_4$. After sufficiently stirred, it was dried. Thus obtained dried substance was heated while supplying 2% $H_2$ gas, using $N_2$ gas as a carrier to fire for 30 minutes at a temperature of 800° C. and fine particles "g" was obtained by firing for 90 minutes at 800° C. in $N_2$ gas atmosphere. The powder color of the fine particles "g" was 36.9875 for L*, −0.2365 for a*, and −4.0526 for b*, and it was found to be $W_{18}O_{49}$ single phase as a result of crystal phase identification by the X-ray diffraction powdered method.

Next, 8 wt % of the fine particles "g", 84 wt % of toluene, 8 wt % of polymer base dispersing agent were measured and a liquid dispersion (liquid L) for forming a solar radiation blocking material was prepared by crashing and dispersing for 6 hours with a paint shaker containing 0.3 mmψ $ZrO_2$ beads. Here, dispersing particle diameter of tungsten oxide fine particles in the liquid dispersion (liquid L) for forming a solar radiation blocking material was measured, and it was found to be 62 nm. Except using thus obtained liquid dispersion (liquid L), a laminated structure T relating to Example 20 was obtained in the same manner as in Example 1.

As shown by a table in FIG. 1, when the visible light transmittance was 66.4%, the solar radiation transmittance was 44.0%, and the haze value was 0.5%.

Example 21

16.1 g of $Ti(NO_3)_3 \cdot 3H_2O$ was dissolved in 24.7 g of water, and this solution was added to 45.3 g of $H_2WO_4$. After sufficiently stirred, it was dried. Thus obtained dried substance was heated while supplying 2% $H_2$ gas, using $N_2$ gas as a carrier to fire for 30 minutes at a temperature of 800° C. and fine particles "h" was obtained by firing for 90 minutes at 800° C. in $N_2$ gas atmosphere. The powder color of the fine particles "h" was 36.9986 for L*, −0.2998 for a*, and −4.1326 for b*, and it was found to be $W_{18}O_{49}$ single phase as a result of crystal phase identification by the X-ray powdered method.

Next, 8 wt % of the fine particles "h", 84 wt % of toluene, 8 wt % of polymer base dispersing agent were measured and a liquid dispersion (liquid M) for forming a solar radiation blocking material was prepared by crashing and dispersing for 6 hours with a paint shaker containing 0.3 mmψ $ZrO_2$ beads. Here, dispersing particle diameter of tungsten oxide fine particles in the liquid dispersion (liquid L) for forming a solar radiation blocking material was measured, and it was found to be 62 nm. Except using thus obtained liquid dispersion (liquid M), a laminated structure U relating to Example 21 was obtained in the same manner as in Example 1.

As shown by a table in FIG. 1, when the visible light transmittance was 66.5%, the solar radiation transmittance was 42.5%, and the haze value was 0.5%.

Example 22

2.8 g of Snowtex N (manufactured by NISSAN CHEMICAL INDUSTRIES LTD.) was added to 54.2 g of $H_2WO_4$ to improve weather resistance. After sufficiently stirred, it was dried. Thus obtained dried substance was heated while supplying 2% $H_2$ gas, using $N_2$ gas as a carrier to fire for 30 minutes at a temperature of 800° C. and fine particles "i" was obtained by firing for 90 minutes at 800° C. in $N_2$ gas atmosphere. The powder color of the fine particles was 35.4446 for L*, 2.0391 for a*, and −7.4738 for b*, and it was found to be $Si_{0.043}WO_{2.839}$ single phase as a result of crystal phase identification by the X-ray diffraction powdered method.

Next, 8 wt % of the fine particles "i", 84 wt % of toluene, 8 wt % of polymer base dispersing agent were measured and a liquid dispersion (liquid N) for forming a solar radiation blocking material was prepared by crashing and dispersing for 6 hours with a paint shaker containing 0.3 mmψ $ZrO_2$ beads. Here, dispersing particle diameter of tungsten oxide fine particles in the liquid dispersion (liquid N) for forming a solar radiation blocking material was measured, and it was found to be 68 nm. Except using thus obtained liquid dispersion (liquid N), a laminated structure V relating to Example 22 was obtained in the same manner as in Example 1.

As shown by a table in FIG. 1, when the visible light transmittance was 71.5%, the solar radiation transmittance was 45.5%, and the haze value was 0.4%.

Comparative Example 1

A laminated structure W relating to Comparative Example 1, was obtained in the same manner as in Example 1 except using commercially available $WO_3$ (manufactured by Kanto Kagaku, the Powder Color: L* is 92.5456, a* is −11.3853, b* is 34.5477).

As shown by a table in FIG. 1, when the visible light transmittance was 72.0%, the solar radiation transmittance was 53.2%, and the haze value was 0.4%.

INDUSTRIAL AVAILABILITY

It is verified that the laminated structure W relating to Comparative Example 1 is inferior in solar radiation transmittance to the laminated structures relating to Examples 1 to 22. Studying of the solar radiation transmittance of the laminated structures relating to Examples 1 to 22 from the solar radiation blocking characteristics described in the table in FIG. 1 shows that the solar radiation transmittance among all group having the visible light transparency of 76.0 or less are less than 50%. Since the solar radiation transmittance of the laminated structure relating to Comparative Example is 53.2%, superiority of the laminated structures relating to Examples are verified.

BRIEF DESCRIPTION OF THE DRAWINGS

FIG. 1 shows a table of solar radiation blocking characteristics of the laminated structures for shielding against solar radiation relating to Examples and Comparative Example of the present invention;

EXPLANATION OF NUMERALS

Figure 2:
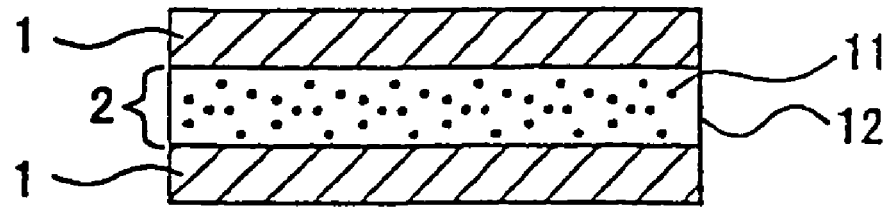
FIG. 2 shows a sectional view of a laminated structure for shielding against solar radiation relating to an embodiment of the present invention.
Figure 3:
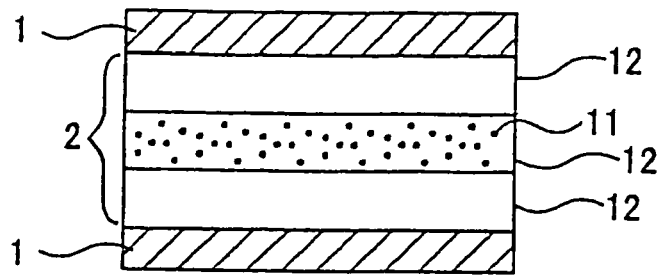
FIG. 3 shows a sectional view of a laminated structure for shielding against solar radiation relating to another embodiment of the present invention.
Figure 4:
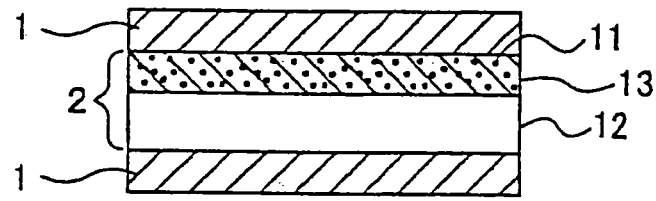
FIG. 4 shows a sectional view of a laminated structure for shielding against solar radiation relating to still another embodiment of the present invention.
Figure 5:
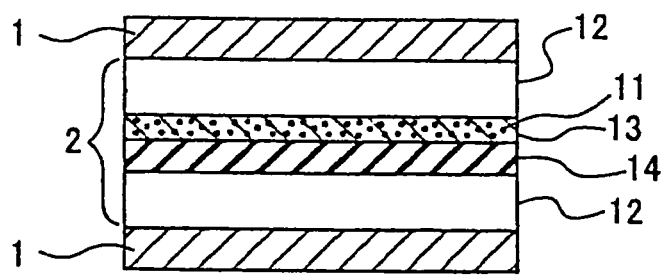
FIG. 5 shows a sectional view of a laminated structure for shielding against solar radiation relating to yet another embodiment of the present invention.
Figure 6:
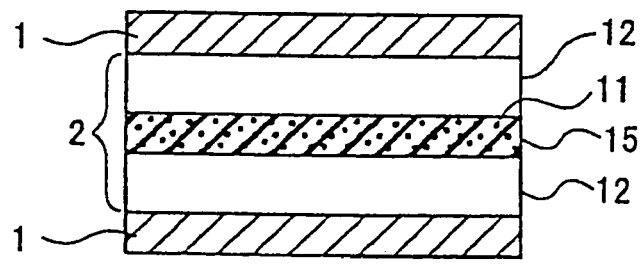
FIG. 6 shows a sectional view of a laminated structure for shielding against solar radiation relating to another embodiment of the present invention.
Figure 7:
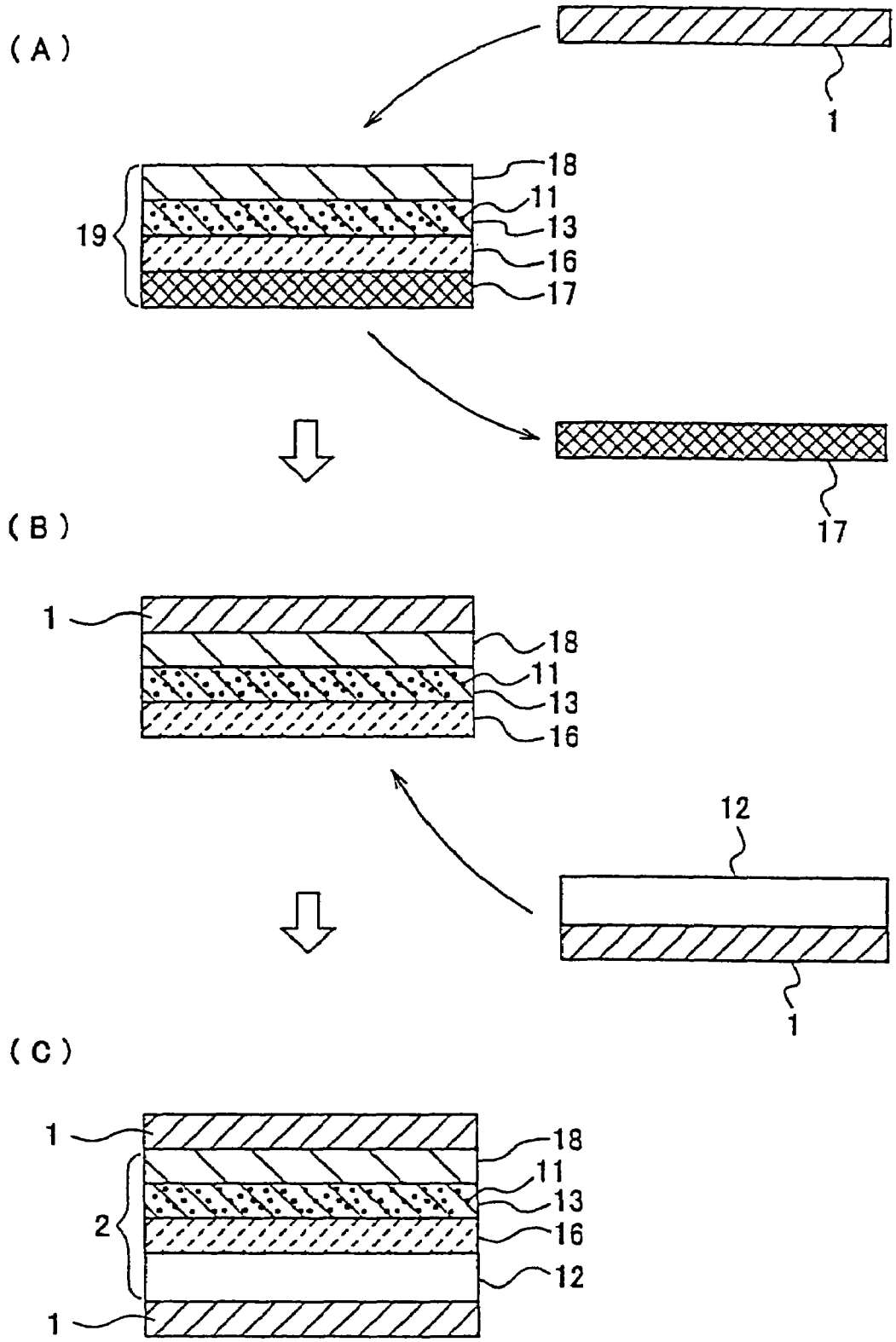
FIG. 7 shows a sectional view in a production process of the laminated structure for shielding against solar radiation relating to another embodiment of the present invention.
Figure 8:
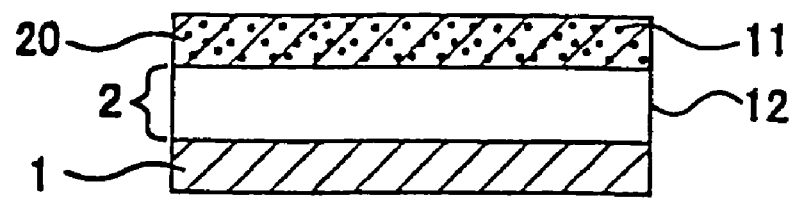
FIG. 8 shows a sectional view of a laminated structure for shielding against solar radiation relating to still another embodiment of the present invention.

1. Sheet to be Laminated
2. Intermediate Layer
11. Fine Particles Functioning to Block Solar Radiation
12. Intermediate Film
13. Solar Radiation Blocking Film
14. Ductile Resin Film
15. Ductile Resin Film Containing Fine Particles Functioning to Block Solar Radiation
16. Peeling Layer
17. Film Sheet
18. Adhesive Layer
20. Sheet to be Laminated Containing Fine Particles Functioning to Block Solar Radiation

The invention claimed is:

1. A laminated structure for shielding against solar radiation, comprising:
    an intermediate layer containing fine particles functioning to block solar radiation sandwiched between two sheets for laminating selected from the group consisting of sheet glass, plastic, and plastic containing said fine particles functioning to block solar radiation,
    wherein said fine particles having the function to block solar radiation comprise composite tungsten oxide fine particles expressed by the general formula MxWyOz where
    M is at least one element selected from the group consisting of H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re,
    W is tungsten,
    O is oxygen, and
    the formula satisfies $0.001 \leq x/y \leq 1$, and $2.0 < z/y \leq 3.0$.

2. The laminated structure for shielding against solar radiation according to claim 1,
    wherein the diameter of said fine particles functioning to block solar radiation is not less than 1 nm and not more than 800 nm.

3. The laminated structure for shielding against solar radiation according to claim 1, wherein
    the powder color in a L*a*b* colorimetric system of said composite tungsten oxide fine particles is between 25 to 80 for L*, −10 to 10 for a*, and −15 to 15 for b*.

4. The laminated structure for shielding against solar radiation according to claim 1,
wherein said composite tungsten oxide fine particles have a hexagonal or monoclinic crystal structure.

5. The laminated structure for shielding against solar radiation according to claim 1,
wherein said fine particles functioning to block solar radiation are a mixture of:
said composite tungsten oxide fine particles; and
one or more types of fine particles selected from the group consisting of
fine particles of oxides, said fine particles of oxides comprise two or more elements selected from the group consisting of Sb, V, Nb, Ta, W, Zr, F, Zn, Al, Ti, Pb, Ga, Re, Ru, P, Ge, In, Sn, La, Ce, Pr, Nd, Gd, Tb, Dy, Ho, Y, Sm, Eu, Er, Tm, Tb, Lu, Sr, and Ca
fine particles of composite oxides, and
fine particles of borides.

6. The laminated structure for shielding against solar radiation according to claim 5, wherein the mixing ratio of said composite tungsten oxide fine particles to said other fine particles is from 95:5 to 5:95.

7. The laminated structure for shielding against solar radiation according claim 1, wherein said plastic is a sheet or film made of polycarbonate resin, acrylic resin, or polyethylene terephthalate resin.

8. The laminated structure for shielding against solar radiation according to claim 1, wherein said intermediate layer has an intermediate film, in which said fine particles functioning to block solar radiation are dispersed.

9. The laminated structure for shielding against solar radiation according to claim 8, wherein a resin to form said intermediate film is vinyl resin.

10. The laminated structure for shielding against solar radiation according to claim 9, wherein said vinyl resin to form said intermediate film is polyvinyl butyral or ethylene-acetic acid vinyl copolymer.

11. The laminated structure for shielding against solar radiation according to claim 1, wherein
said intermediate layer has an intermediate film having two or more layers, and
said fine particles functioning to block solar radiation are dispersed in at least one layer of said intermediate film.

12. The laminated structure for shielding against solar radiation according to claim 1, wherein said intermediate layer comprises
a solar radiation blocking layer containing said fine particles functioning to block solar radiation, said solar radiation blocking layer formed on the inner surface of at least one of said two sheets for laminating selected from said sheet glass and said plastic, and
an intermediate film on said solar radiation blocking layer.

13. The laminated structure for shielding against solar radiation according to claim 1, wherein said intermediate layer comprises a solar radiation blocking ductile film substrate having a solar radiation blocking layer containing said fine particles functioning to block solar radiation formed on one side or inside of a resin film substrate having ductility, and two or more stacked layers of intermediate films between which said solar radiation blocking ductile film substrate is laminated.

14. The laminated structure for shielding against solar radiation according to claim 1,
wherein said intermediate layer comprises:
an intermediate film or two or more stacked layers of intermediate films, and
a layered body in which an adhesive layer, a solar radiation blocking layer containing said fine particles functioning to block solar radiation, and a peeling layer are stacked in this order,
wherein said adhesive layer in said layered body is adhered on the inner surface of one of said two sheets for laminating selected from said sheet glass and said plastic, and
wherein the peeling layer of said layered body is adhered on said intermediate film or on one of said two or more stacked layers of intermediate films.

15. A laminated structure for shielding against solar radiation, comprising:
an intermediate layer not containing fine particles functioning to block solar radiation sandwiched between a plastic sheet to be laminated containing fine particles functioning to block solar radiation, and a sheet to be laminated selected from the group consisting of sheet glass, plastic, and plastic containing said fine particles functioning to block solar radiation,
wherein said fine particles functioning to block solar radiation comprise composite tungsten oxide fine particles expressed by the general formula MxWyOz
where
M is at least one element selected from the group consisting of H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re,
W is tungsten,
O is oxygen, and
the formula satisfies $0.001 \leqq x/y \leqq 1$, and $2.0 < z/y \leqq 3.0$.

16. The laminated structure for shielding against solar radiation according to claim 15, wherein said intermediate layer comprises an intermediate film not containing said fine particles functioning to block solar radiation or two or more layered intermediate films not containing said fine particles functioning to block solar radiation.

* * * * *

UNITED STATES PATENT AND TRADEMARK OFFICE
CERTIFICATE OF CORRECTION

PATENT NO.       : 7,655,301 B2                                          Page 1 of 1
APPLICATION NO. : 10/535234
DATED            : February 2, 2010
INVENTOR(S)      : Chonan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Twenty-eighth Day of December, 2010

David J. Kappos
*Director of the United States Patent and Trademark Office*